(12) United States Patent
Rakib

(10) Patent No.: US 8,510,786 B2
(45) Date of Patent: Aug. 13, 2013

(54) HFC CABLE SYSTEM WITH WIDEBAND COMMUNICATIONS PATHWAY AND COAX DOMAIN NODES

(76) Inventor: Shlomo Selim Rakib, Santa Clara, CA (US)

( * ) Notice: Subject to any disclaimer, the term of this patent is extended or adjusted under 35 U.S.C. 154(b) by 87 days.

(21) Appl. No.: 13/346,709

(22) Filed: Jan. 9, 2012

(65) Prior Publication Data

US 2012/0110631 A1 May 3, 2012

Related U.S. Application Data

(63) Continuation-in-part of application No. 12/907,970, filed on Oct. 19, 2010, and a continuation-in-part of application No. 12/692,582, filed on Jan. 22, 2010, now Pat. No. 8,311,412, application No. 13/346,709, which is a continuation-in-part of application No. 12/692,582, filed on Jan. 22, 2010, now Pat. No. 8,311,412.

(60) Provisional application No. 61/385,125, filed on Sep. 21, 2010.

(51) Int. Cl.
*H04N 7/173* (2011.01)

(52) U.S. Cl.
USPC ........... 725/124; 725/111; 725/114; 725/126; 725/128; 725/129

(58) Field of Classification Search
USPC .................. 725/105, 114, 124, 126, 128–129
See application file for complete search history.

(56) References Cited

U.S. PATENT DOCUMENTS

| | | | | |
|---|---|---|---|---|
| 5,826,167 A | * | 10/1998 | Jelinek et al. | 725/121 |
| 5,963,844 A | * | 10/1999 | Dail | 725/125 |
| 6,075,972 A | * | 6/2000 | Laubach et al. | 455/3.05 |
| 6,381,248 B1 | * | 4/2002 | Lu | 370/437 |
| 2005/0155082 A1 | * | 7/2005 | Weinstein et al. | 725/131 |
| 2005/0283816 A1 | * | 12/2005 | Weinstein et al. | 725/129 |
| 2007/0189770 A1 | * | 8/2007 | Sucharczuk et al. | 398/66 |
| 2008/0216144 A1 | * | 9/2008 | Weinstein et al. | 725/127 |
| 2010/0158049 A1 | * | 6/2010 | Howard et al. | 370/480 |

* cited by examiner

*Primary Examiner* — Chris Parry
*Assistant Examiner* — Gigi L Dubasky
(74) *Attorney, Agent, or Firm* — Stephen E. Zweig

(57) ABSTRACT

System and method to extend the data carrying capacity of a hybrid fiber cable (HFC) network by adding wideband RF signal capability above 1 GHz, and replacing at least some CATV active devices such as amplifiers with a new type of Coax Domain Node (CDN) device that acts to segment the CATV cable portion of the HFC network into a series of smaller domains. The CDN generally filter RF signals from 5-865 MHz, while amplifying and passing RF signals over 1 GHz. Upstream capability is enhanced because the CDN intercept 5-42 MHz upstream signals from each domain and convert to 1 GHz+ signals. Downstream capability is also enhanced because the CDN can take efficiently encoded 1 GHz+ digital data, QAM modulate it, and locally inject into each domain without crosstalk between domains. The system pushes data management and downstream from the head end to the CDN, creating more throughput.

18 Claims, 14 Drawing Sheets

Simplified CATV spectrum diagram

Figure 5A
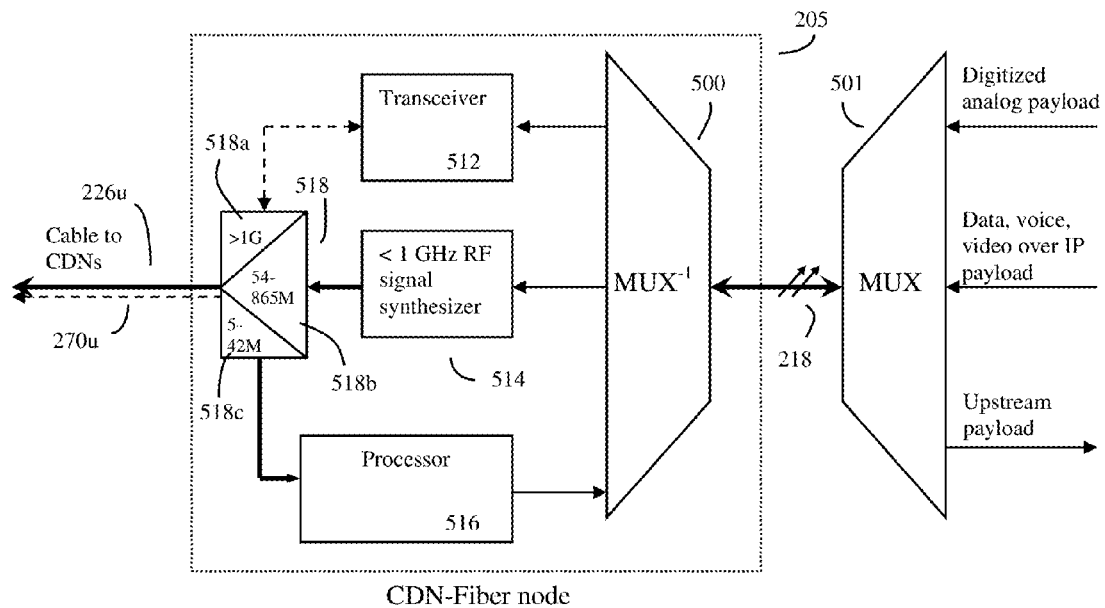
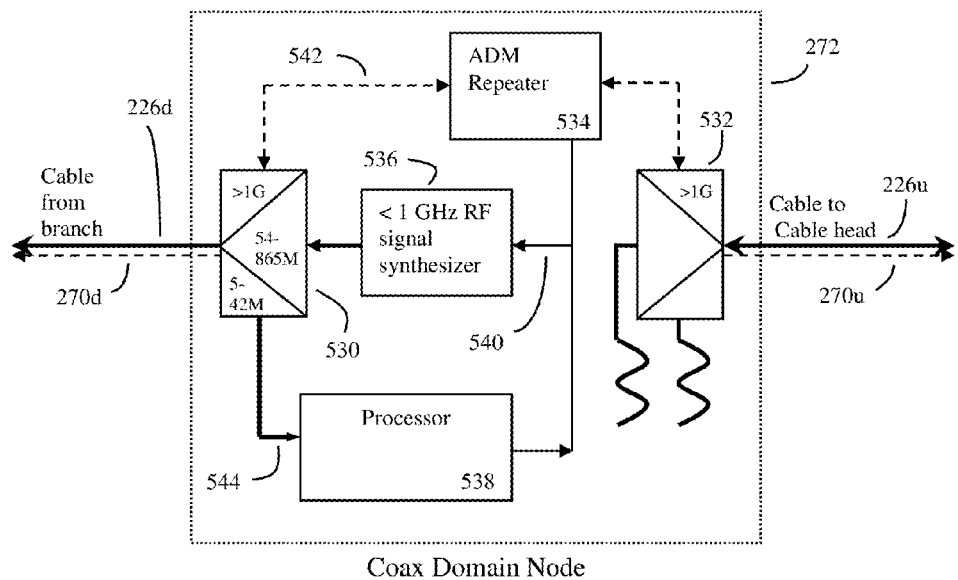

HFC CABLE SYSTEM WITH WIDEBAND COMMUNICATIONS PATHWAY AND COAX DOMAIN NODES

CROSS REFERENCE TO RELATED APPLICATIONS

This application is a continuation in part of U.S. patent application Ser. No. 12/907,970, "HFC CABLE SYSTEM WITH SHADOW FIBER AND COAX FIBER TERMINALS", filed Oct. 19, 2010; U.S. patent application Ser. No. 12/907,970 in turn claimed the priority benefit of U.S. provisional application 61/385,125 "IMPROVED HYBRID FIBER CABLE SYSTEM AND METHOD", filed Sep. 21, 2010, inventor Shlomo Rakib; and U.S. patent application Ser. No. 12/692,582, "DISTRIBUTED CABLE MODEM TERMINATION SYSTEM" filed Jan. 22, 2010, inventor Shlomo Rakib; this application is also a continuation in part of U.S. patent application Ser. No. 12/692,582, "DISTRIBUTED CABLE MODEM TERMINATION SYSTEM" filed Jan. 22, 2010, inventor Shlomo Rakib; the contents of these applications are incorporated herein by reference.

FIELD OF THE INVENTION

The invention is in the general field of Cable Television and Hybrid Fiber Cable systems, particularly with regard to providing extended features and Internet access.

BACKGROUND OF THE INVENTION

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to about 865 MHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

In a typical HFC system, at the various optical fiber nodes, the optical fiber signals are transformed back into RF signals and are then carried by the various neighborhood CATV coax cables to various households. Unlike fiber, which can carry optical signals for extensive distances without significant signal strength attenuation, the RF signals attenuate fairly rapidly as a function of distance over the CATV coax cables. This attenuation versus distance function increases as the frequency of the RF signals increases. For example, using RG-59 cable, at 10 MHz, the RF signal attenuation versus distance is about 1.1 dB/100 feet, at 100 MHz, the RF signal attenuation versus distance is about 3.4 dB/100 feet, at 400 MHz, the attenuation rate is 7.0 dB/100 feet, and at 1000 MHz (1 GHz), the attenuation rate is 12 dB/100 feet. Other types of coax cables, such as RG-6 cables, have lower attenuation versus distance characteristics, but the same sort of attenuation problem still exists.

Thus, in order to maintain the RF signal of the various upstream and downstream signals while traveling over neighborhood CATV coax cables, neighborhood CATV systems typically employ various active (powered) devices, such as powered forward and reverse (bidirectional) RF amplifiers and the like. At present, using CATV systems that often have a maximum frequency of about 550 or 850 MHz, these active devices are often spaced about every 1000 feet.

Each active device can have several (e.g. 1-4) neighborhood CATV sub-cables connected to it, and often to maintain RF power over cable distances of several thousand feet, more than one (usually 1-3) active devices can be connected along a single stretch of coax cable. As a result, at a neighborhood level, the coax cable wiring pattern of CATV systems often has a "tree" like structure, where the branches of the CATV coaxial cable tree spring off of the various active devices. The first or main CATV coax cable that connects to the RF signal originating from the optical fiber node is often referred to as the "trunk" cable, and the various coax cables that split off of the trunk cable are often referred to as branch cables, and the branch cables in turn can have other branch cables splitting off of them as well. As the various trunk and branch cables cover the local neighborhood, and generally situated in between the various active devices, various taps, splitters, and drops on the neighborhood or "trunk" CATV cable connect various households to the CATV cable. In order to provide power for the various active devices, often the CATV coax cable system will carry electrical power as well. As might be expected, the process of negotiating easements and right of way to route the neighborhood CATV cables is burdensome, however this process has been going on for over 50 years in various parts of the country, and by now is well established.

At present, in United States CATV systems, the 5-42 MHz frequency region is reserved for upstream communications back from the various cable modems to the cable plant/cable head end, and the majority of the bandwidth, typically in the 54-547+ MHz range (often the upper end extends to 865 MHz and beyond) is reserved for downstream communications from the cable plant to the various households. European CATV systems follow a slightly different scheme where the upstream communications frequencies extend up to the 65 MHz region, and the downstream communications frequencies are typically in the 88 to about 865 MHz range. The intermediate frequencies between 42-54 MHz (US) and 65-88 MHz (Europe) are generally unused due to the filtering switch over in this region. Due to rapid signal attenuation, the higher frequencies above about 750 to 865 MHz (here referred to generically as 1 GHz+ frequencies or wideband frequencies) are seldom used at present.

A more detailed discussion of prior art in this field can be found in copending application Ser. Nos. 12/692,582, and 12/907,970, the contents of which are incorporated herein by reference. Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

Although at present, the CATV spectrum above approximately 1 GHz is generally unused, there has been some interest by Xtend Networks Ltd, Tel-Aviv Israel, and other companies (e.g. Javelin Innovations, Inc.) in various methods to utilize this wideband spectrum. This prior art work, exemplified by U.S. Pat. Nos. 7,138,886; 7,209,497; 7,616,890; 7,748,023; 7,904,932; 7,933,772; and 7,927,739 has generally tended to focus on addressing various issues related to frequency conversion of signals between the spectrum under 1 GHz, and suitable taps and amplifiers to handle the spectrum above 1 GHz, but generally have otherwise tended to deal with the CATV spectrum above 1 GHz as if this higher frequency region should be considered to be a simple extension of present CATV data communications practices.

BRIEF SUMMARY OF THE INVENTION

The invention is based, in part, on the insight that although the CATV frequencies above 1 GHz do indeed represent a presently untapped CATV data transmission opportunity, more efficient use of these 1 GHz frequencies may be obtained by more substantially departing from past CATV data communications practices.

The invention is also based, in part, on the insight that the CATV RF spectrum above 1 GHz may be usefully viewed as almost being its own separate communications pathway, to be managed in a way that that can be quite different from the traditional or legacy management of the CATV RF spectrum below 1 GHz.

Data is primarily transmitted over CATV cable in the form of various radio-frequency (RF) Quadrature Amplitude Modulated (QAM) channels. Prior art practice in the CATV industry has usually been to generate these QAM channels at the cable head end, transmit them through optical fiber (capable of transmitting enormous amounts of data) as QAM modulated optical signal, to various optical fiber nodes connected to local CATV cables, where data is then transmitted by various RF waveforms. As previously discussed, these local CATV cables in turn are usually arranged in a tree-like network with various cable branches, all ultimately connecting to various user CATV cable connected communication devices (communications devices), such as cable modems, set top boxes (STB), Ethernet terminals, and the like, distributed throughout the various neighborhoods.

From a data carrying standpoint, the optical fiber cable can be viewed as a huge (i.e. very high capacity) data pipeline, terminating at the various optical fiber nodes into various tiny data straws (e.g. much less data carrying capacity) carried by RF signals over CATV cable.

Although extending the frequency of CATV cable from, for example, the prior art 0-1 GHz range by providing perhaps additional data carrying capability in the 1-2 or 1-3 GHz bandwidth region will, of course, improve the data carrying capability of the local CATV cable by perhaps a factor of 2-3, if prior art methods of carrying data are used, the net effect will not otherwise be overly dramatic. That is, instead of the massive optical fiber data pipe terminating in various single tiny data straws (that represent the local optical fiber nodes and the data carrying capability of the various local CATV tree and branch networks), we will now terminate in two or perhaps three tiny local data straws.

Thus an important invention insight is that unless a substantially different CATV data management scheme is adopted for extended high frequency 1-2 or 2-3 GHz range CATV signals, the improvements will not be all that dramatic. That is, any improvement upgrade of CATV components from the present roughly 0-1 GHz range to perhaps and extended 0-2 or 0-3 GHz+ range will not be all that great, and perhaps may not be worth the effort. The data straws will still be tiny, relative much more substantial data carrying capability of the optical fiber data pipeline.

The invention is also based on the insight that various individual users (represented by local communication devices) connected to the massive optical fiber data pipe by the tiny data straw of their local CATV cable system do not generally need to use very much of the optical fiber data pipe carrying capability. Rather, what the local, CATV connected, users need is an ability to rapidly pick and choose portions of the data of interest from the massive optical fiber data pipe. If the various users can quickly get a customized narrowcast version of their data selection, their data selection may adequately fit down the tiny data straw of their local CATV cable. Similarly, even when local users may on occasion need to quickly upload massive amounts of data, they still will not need to use much of the data carrying capability of the massive optical fiber data pipeline. Rather, if the various local CATV users can overcome the bottleneck of the limited upstream capability of prior art CATV cable, their upstream needs will likely also be met for the foreseeable future.

The invention is based, in part, on the insight that it is desirable to depart from past practices, which relegated much of the process of optical fiber and CATV signal data management and signal conversion at the cable head end. Rather, according to the invention, improved performance can be obtained by pushing much more of the system's data management and signal conversion capability much closer to the end user, in fact almost as close to the end user as commercially feasible. Thus the present disclosure continues the work of prior disclosures Ser. Nos. 12/907,970 and 12/692,582, which also taught the benefits of pushing more of the systems data management and signal conversion capability closer to the end user.

The invention is also based, in part, on the insight that CATV frequencies above 1 GHz represent a great opportunity to implement such an improved downstream-pushed data management signal and conversion capability. Thus, for example, a local user communication device (e.g. a cable modem, STB, or Ethernet terminal), upon needing extra upstream or downstream data channels, may initiate a request for extra service (e.g. more data carrying capability) to a new type of CATV active device, here called a "Cable Domain Node". The Cable Doman Node (CDN) in turn can relay this request for extra service to the local cable fiber node, and the local cable fiber node can in turn access the massive optical fiber data pipe. The local cable fiber node can transmit and receive data from the optical fiber, and relay it to the local Cable Domain Nodes distributed along the CATV cable, often using the 1 GHz+ frequency range.

In some embodiments, this extra service may be transmitted using more efficient digital protocols (e.g. using various Ethernet protocols), between the various Cable Domain Nodes, or between the Cable Domain Nodes and the local optical fiber node, often in the 1 GHz+ (greater than 1 GHz) frequency range, and then converted to and from various RF QAM signals for sending to local CATV users. Depending on the implementation desired, these RF QAM signals can either be in the standard 0-1 GHz range, in the wideband 1-2, 1-3, or 1-3+ GHz range, or both the standard range and the wideband range.

In some embodiments, particularly useful when high backward compatibility is desired, as well as other applications, it may be useful to configure the invention's Coax Domain Nodes to suppress or filter some or all of the CATV signals below 1 GHz, while continuing to pass all CATV signals above 1 GHz. This type of embodiment has the net effect of segregating a stretch of CATV cable with multiple Coax Domain Nodes into individual domains that exist in the coax cable in-between each set of Coax Domain Nodes. Within each coax cable domain (domain), CATV signals below 1 GHz can continue to flow freely between the coax cable connected households, but these CATV signals below 1 GHz may not flow freely past the Coax Domain Junction to the coax cable bounded by the next set of Coax Domain Nodes. By contrast, the Coax Domain Nodes may be configured to allow the CATV RF signals above 1 GHz to flow freely up and down the CATV cable across multiple Coax Doman Nodes.

Thus, in some embodiments, the invention may be a system and method to extend the data carrying capacity of a hybrid fiber cable (HFC) network by adding wideband RF signal capability above 1 GHz, and replacing at least some CATV active devices such as amplifiers with a new type of Coax Domain Node (CDN) device that acts to segment the CATV cable portion of the HFC network into a series of smaller domains. The CDN generally filter or terminate RF signals from 5-865 MHz, while amplifying and relaying or passing RF signals over 1 GHz. Using this scheme, the system's upstream capability is greatly enhanced (e.g. by an order of magnitude or more), even with legacy communications devices, because the CDN can intercept 5-42 MHz upstream signals from each domain and convert to 1 GHz+ signals, thus relieving upstream signal congestion and contention. Downstream capability is also greatly enhanced because the CDN can take efficiently encoded 1 GHz+ digital data, QAM modulate it, and locally inject into each individual coax domain as needed by the local communications devices, without worry of unwanted crosstalk between domains. The invention thus pushes data management and downstream from the cable head end to the various Cable Domain Nodes, creating more upstream and downstream throughput.

BRIEF DESCRIPTION OF THE DRAWINGS

FIG. 5A shows a block diagram showing various embodiments of the Coax Domain Node device, and the optical fiber node that serves this type of device.

DETAILED DESCRIPTION OF THE INVENTION

Figure 1:
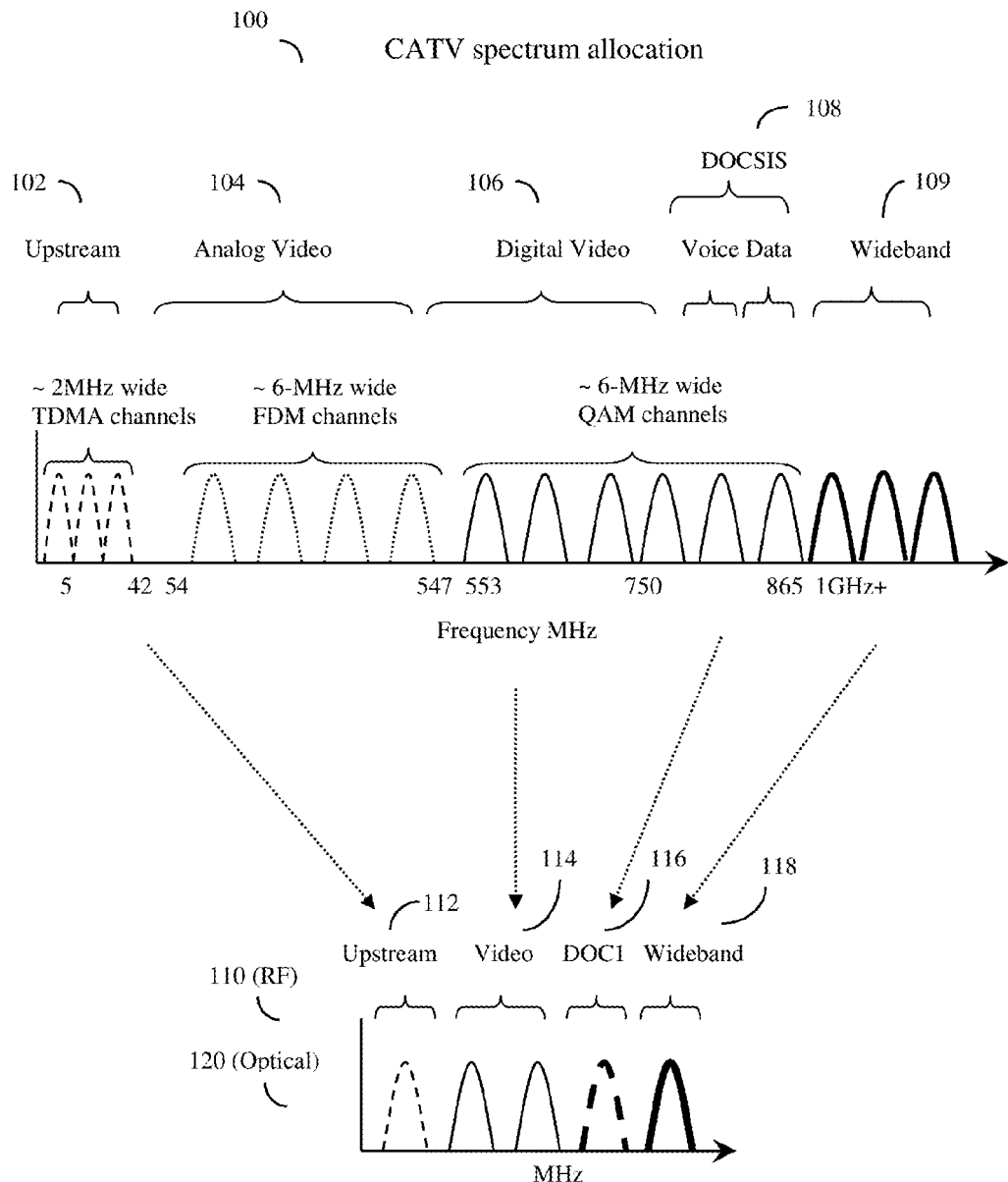
FIG. 1 shows an overall view of the various frequencies and data channels that are presently allocated for a typical CATV cable systems carrying legacy analog television FDM channels, QAM digital television channels, and various types of Data Over Cable Service Interface Specification (DOCSIS) data, as well as the wideband frequencies above about 1 GHz.

In one embodiment, the invention may be a system and method for enhancing data carrying capacity of a hybrid fiber cable (HFC) network with a cable head end, at least one optical fiber, at least one optical fiber node terminating on at least one CATV coaxial cable, (CATV cable). This CATV cable will often be connected to a plurality of other branch CATV cables thus forming a CATV Tree and Branch Network. Usually a plurality of various types of communication devices (e.g. set top boxes, cable modems, Ethernet terminals, etc.) will be connected to this CATV Tree and Branch Network at various places.

Although standard (e.g. prior art optical fiber nodes) or slightly modified prior art optical fiber nodes may often be used for the invention, in a preferred embodiment, the optical fiber node itself will have some unique capabilities, such as the ability to carry out various Coax Doman Node functions to be described.

The invention relies on sending both non-standard CATV RF signals of 1 GHz and greater, and more conventional CATV RF signals between about 5-865 MHz, over various CATV cable pathways. Unfortunately standard (prior art) CATV coax cable is often populated with various devices (e.g. filters, amplifiers, taps) that can block 1 GHz+ RF signals. Thus a first step for the invention's system or method is to create a coax cable based bidirectional wideband communications pathway mediated by RF frequencies of approximately 1 GHz or greater between the CATV optical fiber node(s) and to and between a plurality of Coax Domain Nodes disposed along the CATV Tree and Branch network. This can generally be done by picking coaxial cable that has good 1 GHz+ frequency transmission characteristics, and also using filters, amplifiers, and taps that can conduct both low frequency (less than 1 GHz) and high frequency (greater than 1 GHz) RF signals. For example, by swapping out earlier, non 1 GHz+ compliant filters, amplifiers, and taps with improved 1 GH+ compliant filters, amplifiers, and taps, a legacy CATV cable system can be upgraded to at least handle the 1 GHz+ signals required for the invention.

Further, according to the invention, at various junctions along the CATV tree and branch network, a new type of active device, here called a Coax Domain Node, will be placed. These Coax Domain Nodes (CDN) will be described in more detail later in this discussion. Briefly, the Coax Domain Nodes act to relatively freely pass (e.g. relay, boost, or relay and boost with some modifications to be described) CATV RF signals of approximately 1 GHz frequency or more. However the Coax Domain Nodes will often be configured to intercept and terminate most or all prior art CATV RF signals, such as both upstream and downstream signals in the roughly 5 MHz range to about 865 MHz (nominal upper end of prior art CATV RF signals), here described as CATV RF signals of approximately 1 GHz frequency or less.

Although it might thus look, at first glance, like a prior art 5-865 MHz capable CATV communication device, such as a set top box or cable modem connected to CATV cable with periodic Coax Domain Nodes, might thus be completely unable to either transmit or receive any signals to and from the head end or the optical fiber node end of the CATV cable, this is not the case, because the invention essentially acts to push some of the RF signal generating and receiving properties of the cable head end down to the level of the individual Coax Domain Nodes. This is because the various Coax Domain Nodes designed to be capable of communicating with their own set of local CATV cable connected communications devices on a local domain specific basis.

Here, for simplicity, consider a "domain" to be a stretch of CATV coax cable that is terminated on either end by either two Coax Domain Nodes, a optical fiber node and one Coax Domain Node, or a Coax domain node and an a RF terminator end cap. Absent active assistance by the Coax Domain Nodes, the CATV coax cable in this domain is thus isolated in the roughly 5-865 MHz RF region from the other sections of CATV coax cable, but RF signals of 1 GHz+ can still pass through the domain (actively assisted or modified by the Coax Domain Nodes as needed).

The Coax Domain Nodes (CDN) work by performing various RF signal modifying processes. In particular, they act to intercept local upstream CATV RF signals from various communications devices connected to the domain (stretch of coax cable) served by that particular CDN. As previously discussed, these local upstream CATV RF signals will generally have a frequency of approximately 1 GHz or less, often 5-42 MHz in the US, or 5-54 MHz in Europe. The CDN will terminate at least some (and often all) of these local upstream CATV RF signals, and as previously discussed will often terminate some or all of the standard CATV upstream channels (e.g. 65-about 865 MHz in the US, 88 to about 865 MHz in Europe) as well. Here for simplicity, we will generally assume that all signals below about 1 GHz (e.g. 5-865 MHz or so) are usually blocked, but of course various notch filters, active devices, and the like can be designed to allow certain intermediate frequencies less than 1 GHz to pass by or be relayed by the CDN without departing from the spirit of the invention.

The CDN intercept the local upstream signals, remodulate and often reformat them to the 1 GHz+ frequency range, and then allow the local upstream channels to pass from one domain to another, and on down to the optical fiber node and ultimately the cable head.

The methods by which the CDN do this by modulating of these local upstream CATV RF signals (or alternatively some or all of the data obtained from these local upstream CATV RF signals) to an RF frequency of approximately 1 GHz or more will be described later in this specification.

Using this procedure, the invention's system and method can then use the wideband (1 GHz+) capable CATV cable network to transport upstream data back to the optical fiber node and to the head end (e.g. "backhaul") as either a frequency shifted (and often repackaged) version of the local upstream CATV RF signals themselves. Alternatively the underlying data from these local upstream CATV RF signals can be extracted, repackaged, and frequency shifted. By either mechanism, the system sends the upstream data back, using 1 GHz+ RF signals to the optical fiber node. The optical fiber node can in turn transmit the upstream signals back to the head end using optical fiber at various wavelengths (to be discussed).

The various Coax Domain Nodes can also locally generate downstream RF signals for the various (and otherwise RF isolated) cable communications devices, such as legacy 5-865 MHz capable communications devices. (Note that more sophisticated next-generation cable communications devices might access the 1 GHz+ RF frequencies directly). To do this, the Coax Domain Nodes can selectively extract data carried by the 1 GHz+ wideband RF signals down the wideband communications pathway, modulate this data into downstream CATV RF signals of approximately 1 GHz or less (often using the prior art CATV channels in the 54-865 US MHz range or European 88-865 MHz range as desired), and transmit this now domain specific downstream data to the various CATV cable connected communications devices on their particular domains (stretch of CATV cable).

This method can thus be quite backward compatible with prior art CATV systems, while also providing much additional functionality. In particular the invention's methods can handle upstream CATV signal such as DOCSIS, DVB, Aloha, and other non-DOCSIS signals. Indeed, there is no reason to restrict the upstream frequencies to their prior art 5-42 MHz (US) or 5-54 MHz (Europe) limits. When less backward compatibility is desired, upstream signals up to 1 GHz could be intercepted and backhauled in this manner. As will be discussed in more detail later, the Coax Domain Nodes can handle the upstream RF signals by various methods. One method is to simply sample and digitize at least some of the upstream CATV RF signals, for example by Nuquist sampling methods at 2× the highest frequency of the particular upstream RF signals sampled. This digitized data can then be used to modulate a higher frequency (1 GHz+) RF signal, which will then be relatively freely transported back to the fiber node and head end.

Alternatively, as previously mentioned, more sophisticated methods may be used. For example, instead of simply sampling the full CATV upstream RF signal, the underlying data carried by this upstream RF signal can be extracted locally (e.g. at the Coax Domain Node), and then repackaged into a much more concise or condensed 1 GHz+ RF signal for subsequent backhauling to the fiber node and head end. To do this, however, the Coax Domain Nodes will need to be able to locally read and interpret the upstream data, and to do this they will need access to the various CATV data encoding and decoding schemes, which are often provided by Mini-slot Allocation Packet (MAP) data.

As an example of a more sophisticated method, the process of digitizing the upstream CATV RF signals can be done by obtaining (usually from the cable head end) Mini-slot Allocation Packet (MAP) data for at least some of said upstream CATV RF signals, and using this Mini-slot Allocation Packet (MAP) data to demodulate and extract at least some of the this upstream digital information. Once this is done, the extracted upstream data can then be reformatted into an alternative (and usually more bandwidth efficient) format for 1 GHz+ frequency RF transmission back to the fiber node, and from there to the cable head end.

One advantage of using this type of MAP decoding method is that this method is used and understood by prior art CATV systems and legacy head end equipment. Thus this method can be generally compatible with legacy head end equipment, because once the data is received at the head end, the same Mini-slot Allocation Packet (MAP) data can be used to subsequently remodulate or reproduce the original digital information carried by the upstream signals into reconstituted upstream CATV RF signals at the cable head. This produces reconstituted upstream CATV RF signals. These reconstituted upstream CATV RF signals then be fed to either a legacy Cable Modem Termination System, or an upgraded form of a Cable Modem Termination system.

Because the 1 GHz+ wideband communications pathway taught here is new, there is no need to constrain its communication protocols to follow legacy CATV communications protocols. In principle a large variety of different 1 GHz+ RF communications methods may be used. For example, either the upstream or downstream wideband communication pathway data can be transmitted, as per the design of the Coax Domain Nodes, according to a Time Division Duplex (TDD) scheme, Frequency Division Duplex (FDD) scheme, or Full Bidirectional Duplex without time or frequency division scheme. Other schemes are also possible.

Because the invention's method will potentially be carrying much more upstream and downstream traffic than was previously possible with prior art methods, in some embodiments, once this traffic reaches the various optical fiber nodes, it may be useful to use additional optical fiber wavelengths to carry this additional upstream or downstream data traffic. Thus for example, the downstream data can be transmitted over the optical fiber from said Cable head end to the optical fiber node at a first wavelength, and the upstream data can be transmitted from the optical fiber node to the head end over the optical fiber at one or more alternate (second, third) wavelength(s).

In order to transmit data downstream on the frequencies below about 1 GHz, because the Coax Domain nodes will normally terminate these signals from the prior section of cable, the Coax Domain Nodes must thus be configured to locally modulate and transmit such signals (e.g. 65-865 MHz signals for the US, 88-865 MHz signals for Europe). Although in principle any RF modulation scheme may be used for this, in view of the extensive use of QAM modulation methods in the CATV industry, and the huge investment in legacy QAM capable cable devices, in a preferred embodiment, the various Coax Domain Nodes will be equipped with at least one, and often a plurality of, QAM modulators for downstream data transmission to the various communications devices.

In particular, in a preferred embodiment, at least some (and often all) of the various Coax Domain Nodes will contain at least one QAM modulator device capable of encoding, on a domain specific basis, selected portions of the 1 GHz+ downstream wideband communications pathway data into various RF QAM waveforms (usually in the 65/88 to around 865 MHz region). These QAM modulators will (in conjunction with a device configured to select the appropriate portion of the 1 GHz+ wideband signal to transmit), modulate at least selected portions of the downstream wideband communications pathway data into downstream CATV RF signals of approximately 1 GHz frequency or less.

Although in principle, the various Coax Domain Nodes may be fixed function "dumb" devices that continually perform the same operations, in a preferred embodiment, the Coax Domain Nodes (and usually the associated CDN-fiber nodes) will be configured to be intelligent devices that can differentially add and extract data from the 1 GHz+ wideband communications pathway, and can transmit and receive on different frequencies according to various commands sent from a remote location, such as the cable head, the local communications devices, or even other Coax Domain Nodes. To do this, the Coax Domain nodes will generally be configured with at least one microprocessor/microcontroller, appropriate software, and appropriate ability to intercept commands (often sent on the 1 GHz+ RF frequency range, or lower frequencies if the commands are being sent from local communications devices)

Thus the various Coax Domain Nodes will often comprise at least one QAM modulator device capable of encoding selected portions of the digitally encoded wideband communications pathway data into RF QAM waveforms of approximately 1 GHz frequency or less. The Coax Domain Nodes will also often have at least one software controllable switch that can be remotely directed to select, on a domain addressable basis, at least some of said digitally encoded Wideband communications pathway data. The switch can direct the QAM modulator device(s) to encode the selected digitally encoded ultrahigh frequency (1 GHz+) CATV RF communications data into RF QAM waveforms of approximately 1 GHz frequency or less (e.g. the 65/88-865 MHz frequency region) at a selected set of frequencies within each said domain.

The Coax Domain Nodes will also usually have at least one remotely software controllable RF packet processor that is capable of detecting upstream data carried by CATV RF upstream signals waveforms of approximately 1 GHz frequency or less (often in the 5-42/54 MHz frequency region) generated by the local communications device(s) within each domain. This RF packet processor can be configured to digitally repackage this upstream data (e.g. into a different format as needed) and retransmit this upstream data along the wideband communications pathway in the form of 1 GHz+ RF signals.

As previously discussed, ideally this at least one software controllable switch and/or said software controllable RF packet processor may be designed to be remotely configured by software to assign or reassign, on a domain specific basis, the frequencies used by this QAM rebroadcast data.

FIG. 1 shows an overall view of the various frequencies and data channels presently allocated for CATV (100). Typically the lower frequencies, such as 5-42 MHz (US) or 5-65 MHz (Europe), are allocated for use in transmitting data "upstream" from the individual cable modems back to the Cable Head or Cable plant (102). Typically upstream data is transmitted using a time-share TDMA (Time Division Multiple Access) manner in which MAP data is sent to individual cable modems which allocates certain times on roughly 2 MHz wide QAM channels to transmit data. Starting at around 54 MHz on up to roughly 547 MHz, space was previously allocated for legacy analog video channels (104), which transmit on roughly 6 MHz wide FDM channels. At frequencies above that, frequencies (space, bandwidth) is currently allocated for digital television transmitting on roughly 6 MHz wide QAM channels (106), and above that, space is currently allocated for DOCSIS services (108) that may transmit voice, on-demand video, IP, and other information, again generally as a series of 6 MHz wide QAM channels.

As previously discussed, the invention's wideband communications pathway will generally use the cable bandwidth above about 1 GHz, which is seldom used at present (109).

CATV cable (at least below about 850 to 865 MHz) thus has a finite bandwidth of at most about 100-200 QAM channels. When this bandwidth is used to serve a large amount of different customized types of data to a large amount of different subscribers, this bandwidth quickly becomes exhausted.

A drawing showing how the CATV spectrum allocation can be described in a more simplified diagram is shown below (110), (120). The "upstream" segment (112) is an abstraction of all upstream channels, including both presently used upstream channels in the 5-42 MHz region, as well as present and future higher frequency upstream DOCSIS channels. The "video" segment (114) is an abstraction of both the now obsolete analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present DOCSIS channels. wideband communications pathway (118), as previously discussed, is in the higher frequency range of the CATV spectrum, such as the 1 GHz plus region, where various new GTTH (Gigabyte to the home) services may be provided using the wideband communications pathway network and the various Coax Domain Node devices.

Figure 2:
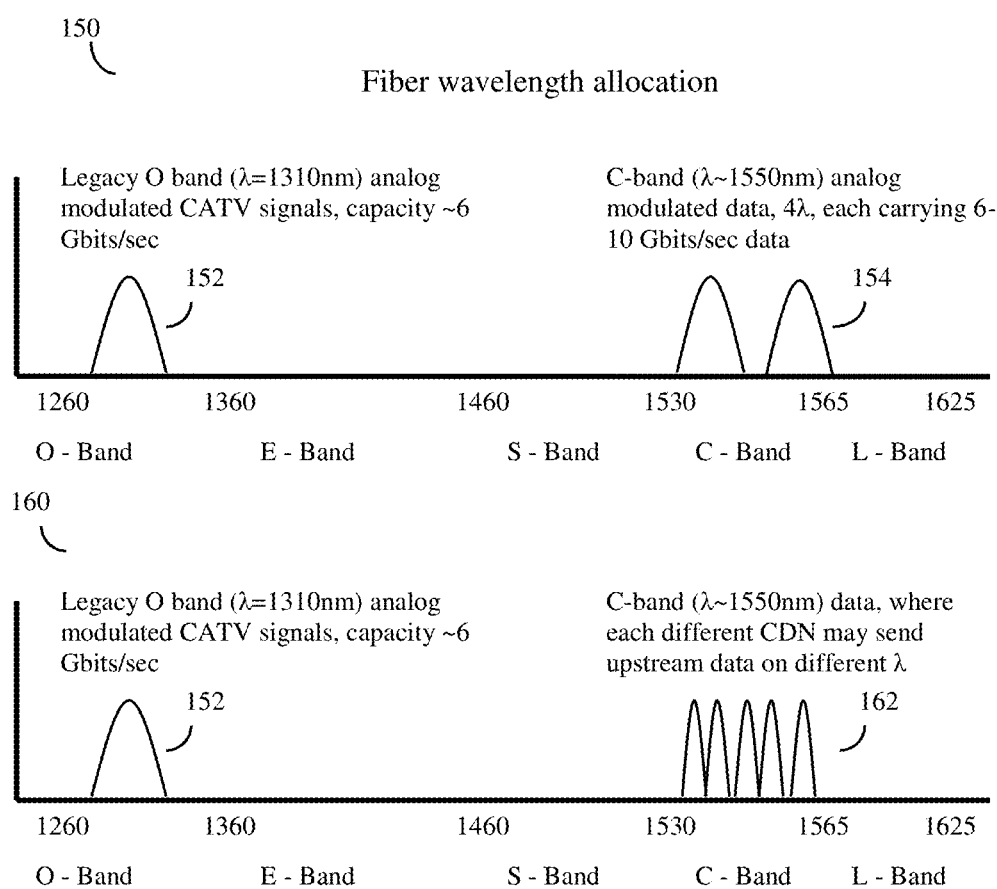
FIG. 2 shows an overall view of the various wavelengths allocated for prior art optical fiber wavelength division multiplexing schemes, as compared to alternative dense wavelength division multiplexing (DWDM) methods, which in some embodiments of the invention may be used by the wideband (1 GHz+) communications pathway network to carry upstream or downstream data.

FIG. 2 shows an overall view of the various optical wavelengths allocated for both prior art optical fiber wavelength division multiplexing schemes, and in some embodiments for various wideband communications pathway upstream and downstream data according to the invention. Here the optical fiber will be used to carry information from the cable head end to the cable fiber node. According to the present invention, after the cable fiber node, information is then carried along the CATV cable as standard (e.g. less than 1 GHz) RF signals, and Wideband (1 GHz+) RF signals.

Here the optical fiber wavelengths being used at present (150) include a 1310 nm O-band wavelength (152) often used to transmit the various CATV RF channels, such as the various QAM channels, modulated essentially according to the same CATV RF waveforms, but at optical wavelengths according to scheme (120). Supplemental data is often transmitted in the C-band around 1550 nm (154), often on optical wavelengths that, because they are modulated according to non-optimal CATV waveforms, must be separated from each other by a relatively large wavelength separation, and which carry sub-optimal amounts of data per wavelength.

Depending upon the particular embodiment, at the fiber node, the wideband communications pathway network may transmit upstream data, or backhaul data, according to either prior art methods, or alternatively according to various multiple wavelength or Dense Wavelength Division Multiplexing methods (160). For example, in one simple embodiment, after the various Coax Domain Nodes in a neighborhood transmit their particular upstream data by 1 GHz+ RF signals over the wideband communications pathway, at the optical fiber node, the upstream data can then be demodulated, analyzed, and repackaged and retransmitted, possibly using one or more of these different wavelengths.

Note that, as previously discussed, each neighborhood will generally have its own wideband communications pathway network, so that in this scheme, different wideband communications pathway frequencies and timing windows may often be reused between neighborhoods without problems of interference.

Here again, a legacy O-band analog signal may be used for upstream communications as desired. Alternatively, multiple wavelengths of more efficiently modulated data signals (such as one of the various optical fiber GigE protocols) may be sent, often as a series of closely spaced wavelengths (162).

Figure 3:
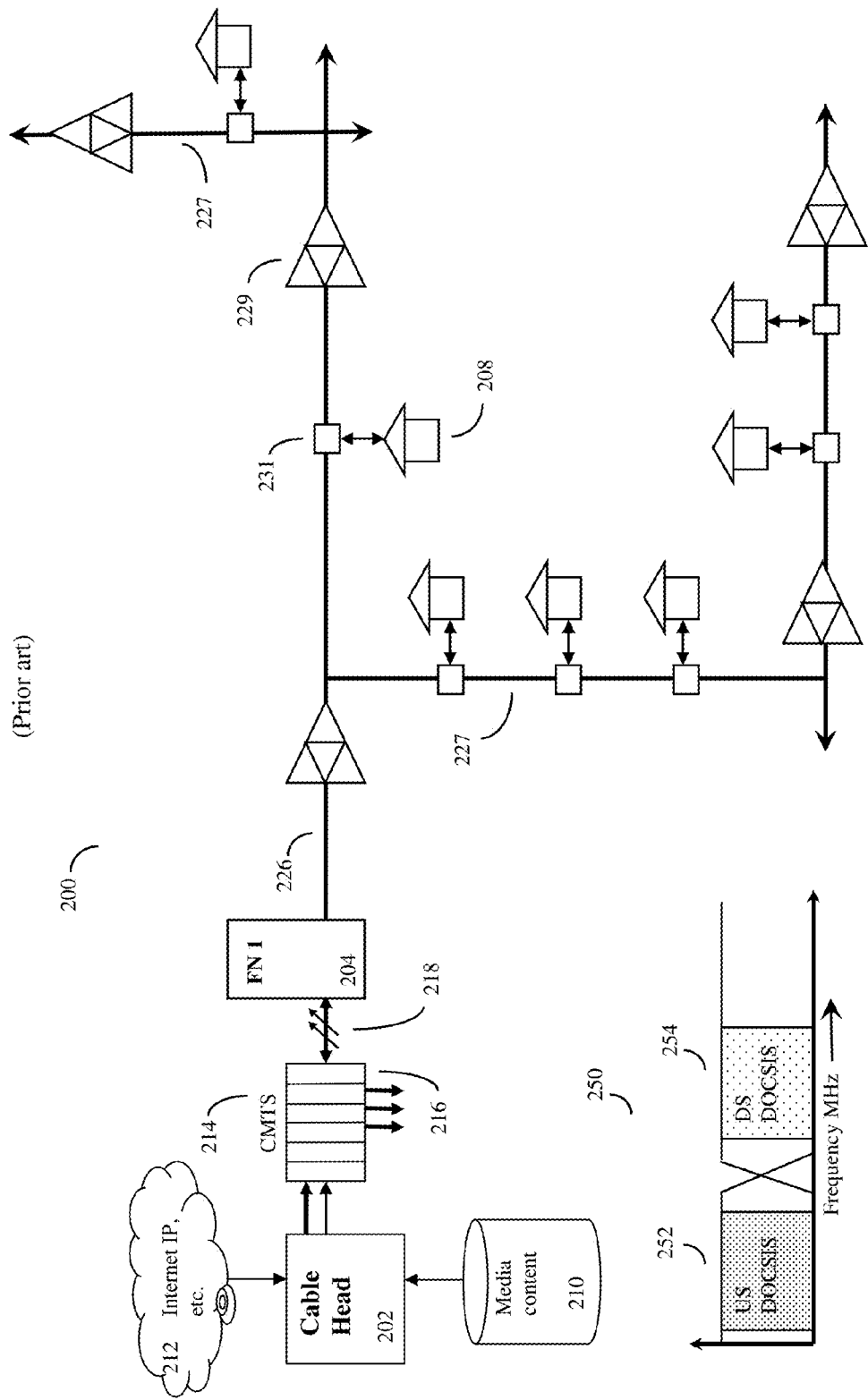
FIG. 3 shows a simplified version of how prior art HFC systems can transmit data from the cable plant or cable head to different optical fiber nodes, each usually connected to a tree and branch like structure of CATV coax cables. The coax cables often contain multiple active devices (e.g. RF amplifiers) often spaced roughly every thousand feet to correct for signal attenuation.

FIG. 3 shows a simplified version of how prior art HFC systems (200) transmit data from the cable plant or cable head end (202) to different optical fiber nodes (204), each usually composed of a tree like trunk (226) and branch (227) structure of CATV cables (226) with active devices, such as RF amplifiers (229), often every thousand feet or so. Each neighborhood will typically consist of up to several hundred or a few thousand different houses, apartments, offices or stores (208) (here referred to generically as "houses"), each equipped with their own cable modems (not shown) and connecting to the CATV cable via a tap (231) Here, for simplicity, only the downstream portion of the HFC system is shown.

The cable head end will obtain standardized media content (210) (such as a standard assortment of analog and digital video channels) from one set of sources, and also obtain more individualized data (212), such as video on demand, IP from the Internet, and other individualized data from other sources. This data is compiled into a large number of different QAM (and at present also FDM) modulated CATV broadcast channels at the CMTS shelf (214). This CMTS (214) will often have a number of different blade-like line cards (216). These line cards transmit the signals by optical fibers (218) to different areas (groups of neighborhoods).

As previously discussed, typical HFC networks actually have a rather complex topology, which here is greatly simplified. Rather than sending one optical fiber from the CMTS to each different neighborhood, typically optical fibers will serve multiple neighborhoods. To do this, the signal from the CMTS side optical fiber (218) will at least usually be split by an optical fiber splitter (not shown) into several different optical sub-fibers, and each sub-fiber in turn will in turn carry the signal to different fiber optic nodes. Here only one Fiber Node, Fiber Node 1 (204) is shown in order to better show the trunk and branch coax cable structure of the neighborhood CATV cable system.

At a fiber node, such as FN 1 (204), the optical signal is converted into a CATV radio frequency (RF) signal and sent via CATV cables (226) to individual cable modems at individual houses (208) in each neighborhood. Typically each neighborhood will consist of between 25 to a few thousand households, served by a CATV cable tree and branch like system of connected cables and active devices such as RF amplifiers (226), (227), and (229) that in turn connects to the local fiber node (204).

The CATV RF spectrum of this prior art HFC system is shown as (250). Here, as previously discussed, at least in the US, the 5-42 MHz frequency region is reserved for upstream signals (252) such as upstream DOCSIS signals (US DOCSIS) going from the households (208) to the cable head (such as the CMTS (214), and the 54-865 MHz frequency region (254) is reserved for downstream signals, such as downstream DOCSIS (DS DOCSIS) going from the cable head to the households (208). Here the US DOCSIS region (252) is drawn as fairly dark (congested with dots) to symbolize the high upstream congestion that occurs when an entire neighborhood of households attempts to send upstream data on this relatively limited region of CATV cable spectrum.

Figure 4:
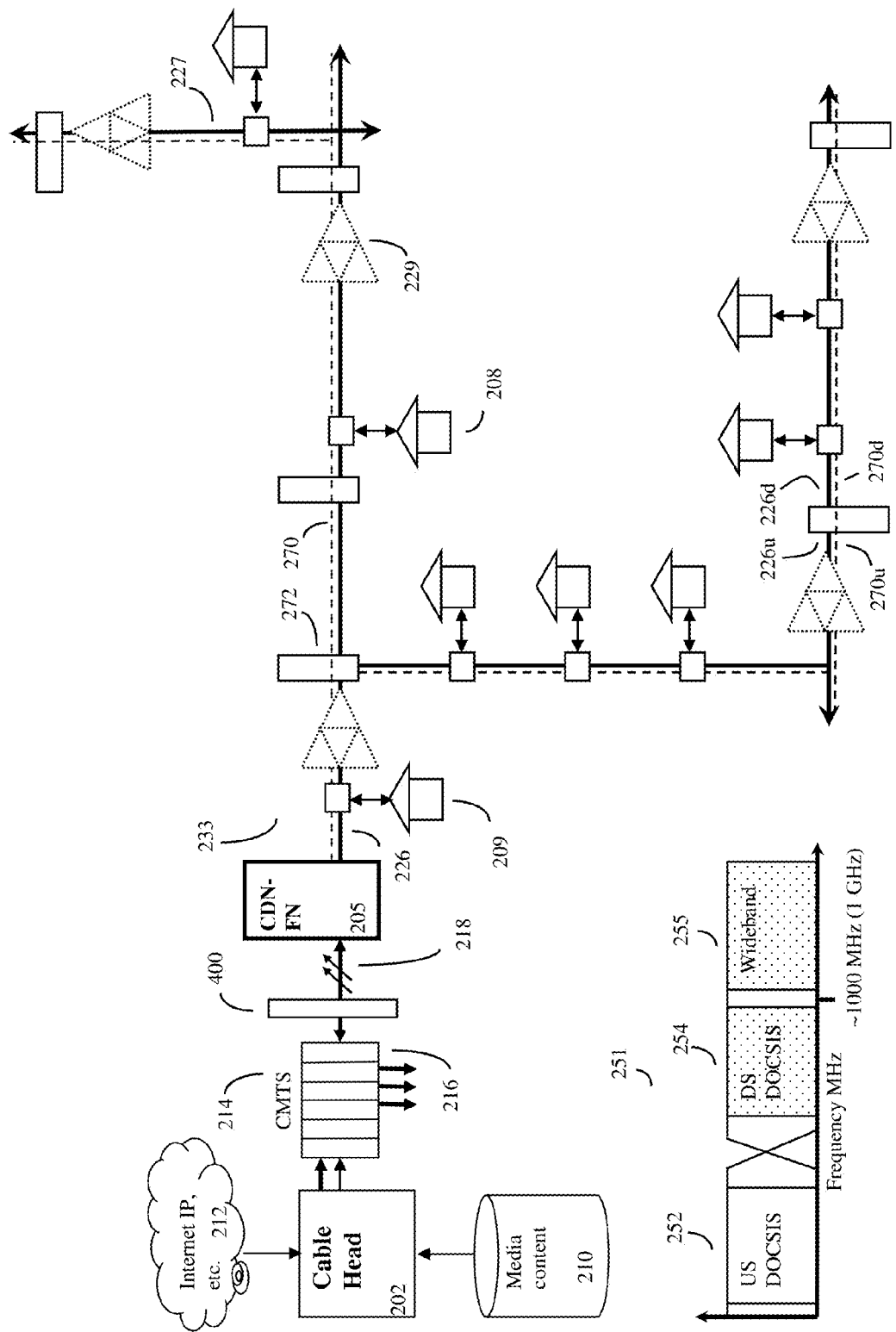
FIG. 4 shows how the invention's "wideband communications pathway" while using the same CATV cable as the prior art neighborhood CATV cable tree and branch coax cables, operates. According to the invention, this wideband communications pathway interacts with a new type of "Coax Domain Node" device (CDN). These CDN devices will often replace prior art CATV active devices such as amplifiers. The CDN devices may remove some or all of the 5-42 MHz upstream RF signals traveling back from the various households along the particular CATV branch cable or trunk cable serviced by that particular CDN device. The CDN devices then can transform at least some of the upstream CATV RF signals and data into upstream 1 GHz+ frequency signals and data, and transmit this back to the optical fiber node and then to the cable head, thus relieving upstream congestion on the neighborhood CATV cables.

FIG. 4 shows how the invention's "wideband communications pathway", symbolized by the dashed line (270), which runs at 1 GH+ frequencies (255) along exactly the same cable as the neighborhood CATV cable trunk and branches that carry the CATV signals from 5 to 865 MHz. (226), (227). This wideband communications pathway runs on CATV coax cable which in turn passes through various Coax Domain Nodes (272). Note how the dashed lines from the 1 GHz+ wideband communications pathway are shown passing through the Coax Domain Nodes, while the darker solid line (226, 227) symbolizing 5-865 MHz (e.g. less than 1 GHz) are shown as being terminated at the various Coax Domain Nodes as a reminder of the signal handling features of the Coax Domain Nodes.

In FIG. 4 and subsequent figures, the portion of the CATV cable facing the optical fiber node and the head end of the cable will generally be designated as (226u) and (270u), and the portion of the CATV cable facing away from the optical fiber node, and away from the head end of the cable will generally be designated as (226d) and (270d). Here again, (226) represents the CATV RF signals under about 1 GHz, while 270 represents the CATV RF signals above about 1 GHz.

When a legacy section of CATV cable is upgraded, these Coax Domain Nodes may often be positioned to replace legacy CATV active devices (e.g. RF amplifiers 229). These legacy active devices (229) are thus shown in dotted lines to indicate that they may be replaced.

The Coax Domain Nodes are often configured to remove some or all of the upstream RF signals (e.g. 5-42 MHz signals) traveling back from the various households (208) along the particular CATV branch cable (227) or trunk cable (226) serviced by that particular active device (229), but are often configured to freely pass the 1 GHz+ frequency RF signals. Thus FIG. 4 (as well as FIGS. 7 and 8) show the low frequency portion of the coax cable (226, 227) stopping at each Coax Domain Node (272), while the 1 GHz+ wideband frequencies (270) are shown as passing through each Coax Domain Node (272).

The Coax Domain Nodes (272) will often transform the 5-42 MHz upstream CATV RF signals and data into 1 GHz+ upstream RF signals and data, and this can be carried back to the cable head, often by way of modified optical nodes (205) via the HFC system.

In some embodiments, these modified optical nodes, alternatively called CDN-fiber nodes, or CDN-FN (205) can, at least in part, be based on concepts first discussed in the CMRTS or D-CMRTS optical nodes as described in copending application Ser. No. 12/692,582 and/or provisional application 61/385,125; the contents of both are incorporated herein by reference.

According to the invention, either prior art optical nodes may be used, and additional CDN devices may be added to intercept upstream data from the wideband communications pathway network (270) and repackage this for transmission back to the cable head, often along optical fiber route (218), often using alternate fibers or alternate wavelengths. Alternatively, the optical node may be modified into a modified optical node with additional CDN functionality (205) with additional components to handle this repackaging internally.

In some embodiments, at the cable head, often just before the CMTS, a decoder apparatus (400) may intercept the optical fiber signals (218) and decode them into a form that can then be recognized by the CMTS. For example, such decoding may be used interpret the CDN domain information into a form that the CMTS can process, and may, for example, make each different Coax Domain Node domain appear to the CMTS as if it is a separate CATV neighborhood. The decoder apparatus may also, in some embodiments, reconstitute upstream data signals coming from the Coax Domain Nodes by way of MAP data or other methods. This will be discussed shortly.

In contrast to the CATV spectrum diagram (250) shown in FIG. 3, the CATV spectrum diagram (251) shown in FIG. 4 is slightly different. In particular, because much or all of the upstream traffic is now going by way of the Wideband communications pathway line (270), the upstream bandwidth (252), such as might be used to carry upstream DOCSIS (US DOCSIS) is much less congested, and is thus shown without the dense pattern of dots to symbolize this difference. By contrast, the downstream DOCSIS (DS DOCSIS) (245) bandwidth can remain much the same as before. However, as is discussed elsewhere in this specification, the very high frequency region, such as the 1 GHz+ region (255), will often be used by the wideband communications pathway (270) and Coax Domain Nodes (272) to deliver high bandwidth services, such as GigE to the home (GTTH), extended data channels, and other services.

FIG. 5A shows a block diagram of some of the major components in one embodiment of the Coax Domain Node (272), as well as a diagram of some of the major components in a CDN-fiber node (205) that connects the CATV cable portion of the system (226, 227) with the optical fiber (218) going to the cable head end (e.g. 400, 216, 214, 202).

The CDN-fiber node (205), which may be used in some embodiments of the invention, receives multiplexed data from the cable head end (e.g. 400, 216, 214, 202) over optical fiber (218), often over one or more wavelengths (e.g. λ1, λ2, and so on). This multiplexed data can consist of various data streams, including for example a digitized analog payload (e.g. head-end created QAM channels) often useful for legacy cable purposes, and data for more specialized DOSIS services such as data, voice, or video over IP.

This particular CDN-fiber node (205) is different from prior art fiber nodes in that it also acts like a terminal Coax Domain Node, and can itself have Coax Domain Node functionality, as well as optical fiber node functionality. As previously discussed, this extra Coax Domain Node functionality is optional. Thus for example, a more standard optical fiber node may also be used if this optical fiber node simply upconverts its signals to 1 GHz+ and then promptly feeds into a Coax Domain Node without any intervening communications devices. Although the CDN-fiber node (205) example will generally be used in this discussion, the optional nature of the added Coax Domain Node functionality should be recognized, and the invention is not intended to be limited to only CDN-fiber nodes. Any type of fiber node (optical fiber node) may, in principle, be used.

At the CDN-fiber node (205), a de-multiplexer (510) can convert this optically transmitted data (from different optical fiber wavelengths λ as needed) into various RF transmitted data for both lower frequency RF transmission (e.g. 5-865 MHz, often by way of RF signal synthesizer (514) and for wideband (1 GHz+) transmission over CATV coax cable (226, 227), often by way of transceiver (512). The major components of the CDN-fiber node will comprise the demultiplexer (510), a transceiver capable of receiving and converting between the RF format and the optical format (512) in the 1 GHz+ wideband range, a RF signal synthesizer (514) that can take suitable optical data and repackage it for lower frequency (e.g. 54-865 MHz) cable transmission, along the chain of Coax Domain Nodes, and a processor that can take local upstream data (often provided by households between the CDN-fiber node and the first true Coax Domain Node) sent on the 5-42 MHz frequency band) and repackage it for optical transmission (516).

The <1 GHz RF signal synthesizer (514) provides downstream Coax Domain Node functionality to the CDN-fiber node (205). This RF signal synthesizer (514) frequently produces RF signals in roughly the 54/65-865 MHz range, and these can pass through Triplex unit (518b) and onto the cable. These units (514)/(518) thus provide RF downstream signals in the 54-865 MHz range (US) or the 88-865 MHz range (for Europe) for any local communications devices (e.g. FIG. 4, 209) connected to the CATV coax cable in between the CDN-fiber node (205) and the first true Coax Domain Node (272). In many embodiments, the <1 GHz RF signal synthesizer (514) may have at least one QAM modulator to convert incoming data, often transmitted or modulated by an alternative protocol, into various downstream RF QAM waveforms with frequencies under 1 GHz (e.g. often in the 55-865 MHz range in the US), as will be shown in more detail in FIG. 8.

Alternatively, the RF signal synthesizer (514) may more directly convert optically modulated QAM waveforms into downstream signals by simpler O/A (optical to analog) converters. The O/A methods and QAM modulation methods are not mutually exclusive, and a mix of these methods may also be used.

Both the CDN-fiber node and the Coax Domain Nodes (CDN) will often have one or more triplex signal splitting and frequency filtering unit (518, 530, 532) that can both combine input data at various frequencies and pass these along to the CATV cable (226, 227), and also receive data (e.g. repackaged upstream data from the various Coax Domain Nodes that is being carried upstream at 1 GHz+ frequencies) and send this upstream data to processor (516) for subsequent reformatting (as needed) and conversion to one or more suitable optical wavelengths suitable for transmission on optical fiber (218). For example, Triplex unit (518) may have one part (518a) that selectively removes (filters out) RF frequencies below approximately 1 GHz, (i.e. the non-wideband signals), and passes the 1 GHz+ signals to and from the transceiver (512). Triplex unit (518) may have a second part (518b) that selectively removes (filters out) the RF frequencies above the top end of the standard CATV range, (e.g. removes frequencies above about 865 MHz), and also may selectively remove (filter out) the normal CATV upstream frequencies from about 5-42 MHz (in the US) or 5-65 MHz (Europe), and which only freely passes the normal CATV downstream frequencies from about 54-865 MHz (US) or 88-865 MHz (Europe). Triplex unit (518) may also have a third part (518c) that filters out all RF signals above about 42 MHz (in the US) or 65 MHz (in Europe), and only allows the upstream RF frequencies of about 5-42 MHz (in the US) or 5-54 MHz (in Europe) to pass freely. Note that the other triplex units (530) and (532) will also act in this manner as well.

Thus processor (516) will provide upstream Coax Domain Node functionality to optical fiber node (205) in that it will be able, in conjunction with Triplex unit 518c, to intercept upstream RF signals sent by any communication devices (e.g. FIG. 4 209) attached to the CATV cable between the CDN-fiber node and the first true Coax Domain Node, and in combination with MUX-1 unit (500) and/or optionally transceiver (512) convert this local upstream data to optical wavelengths for upstream transmission over optical fiber (218).

Note that often one or more of these components will run under the software control of one or more microprocessors (not shown), so that their characteristics may be remotely adjusted by commands sent from the cable head end, or from the Coax Domain Nodes (e.g. a request for an additional channel) as desired.

FIG. 5A also shows a diagram of the Coax Domain Node(s) (272). These nodes, which generally interrupt the CATV coax cable (226, 270) at various intervals (e.g. are junctions in the CATV cable based tree and branch network), perform a number of functions. On the CATV cable facing the downstream portions of the cable (226d, 270d—the cable branch, away from the cable head and the fiber node), there will often be a triplex/filter unit (530), and there will also generally be another triplex filter unit (532) at the upstream (226u, 270u—facing the cable head and the fiber node) portion of the Cable Domain Node. Upstream signals from the cable head are processed by the add drop multiplexer (ADM) repeater (534), and those signals intended for transmission on the lower frequency range (e.g. 5-865 MHz) (540) are sent to the RF synthesizer (536). Additionally, 1 GHz+ wideband upstream signals intended for downstream or upstream transmission (542) are also handled by ADM repeater (534) and triplex/filter (530). Finally, low frequency upstream signals (e.g. 5-42 MHz region), (544) often sent by various households connected to the domain controlled by that particular Coax Domain Node are processed by processor (538), sent to ADM repeater (534), where they can be converted to 1 GHz+ RF signals and sent back upstream in the direction of the fiber node (205) and the cable head end. These lower frequency upstream signals are shown in more detail in FIG. 9.

The ADM repeater essentially handles RF signal traffic on the 1 GHz+ wideband frequencies. This unit both merges new data in the form of new 1 GHz+ signals onto the 1 GHz+ wideband pathway (270), and also intelligently (i.e. usually under microprocessor or microcontroller control) extracts the relevant data from the 1 GHz+ wideband frequencies (270).

The various Cable Domain Nodes (272) will often have at least one and often more than one of their components (e.g. 534, 536, 538) and optional tunable triplex units (530, 532) run under the software control of one or more microprocessors/microcontrollers (not shown), so that their characteristics may be remotely adjusted by commands sent from the cable head end, or from the CDN-Fiber Node, or from other Coax Domain Nodes (e.g. a request for an additional channel) as desired. The CDN-Fiber node (205) will also similarly be adjustable under software control, and can often also accept remote commands. Generally it is contemplated that the flexible upstream and downstream frequency allocation schemes shown in FIG. 8 and FIG. 9 will be accomplished by such software control methods.

In some embodiments, to improve data handling capability still further, it may be useful to extract the underling digital data from the various cable RF waveforms, and repackage this underlying digital data into a more efficient format. To do this, the various devices (205), (272) may be further given the capability to do this type of intelligent data extraction and repackaging. One way is by MAP data analysis, described below.

Figure 5B:
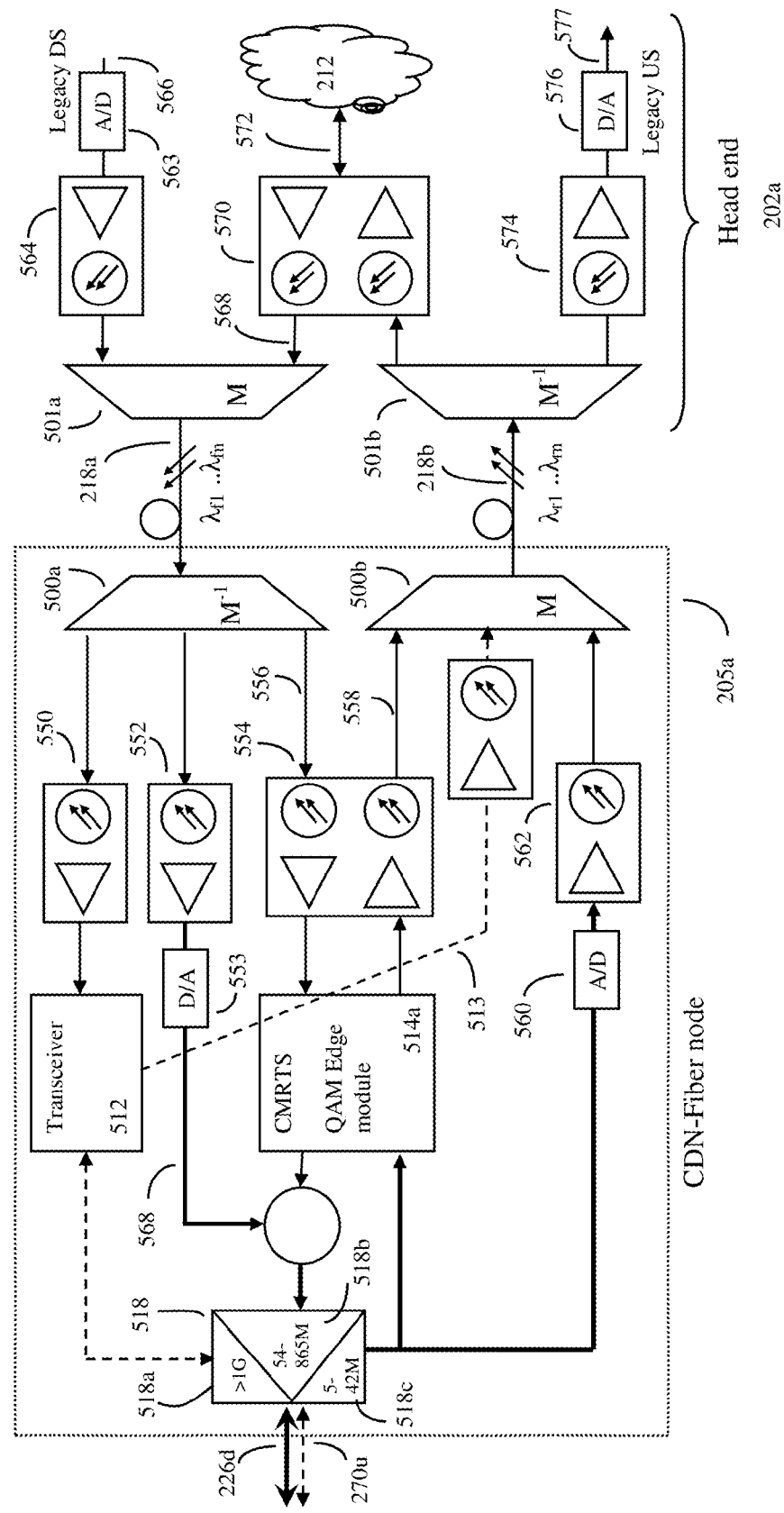
FIG. 5B shows a block diagram that focuses on a second alternative embodiment of the optical fiber node (CDN-fiber node) and one scheme in which this optical fiber node can interact with the cable head end.

FIG. 5B shows a block diagram that focuses on a second alternative embodiment of the optical fiber node (CDN-fiber node) (205a) and one scheme in which this optical fiber node can interact with a complementary embodiment of the cable head end (202a). In this embodiment, the head end (202a) can be transmitting various forms of multiservices data (212) such as standard definition TV (SD), high definition TV (HD) SDV, video on demand (VOD), internet protocol television (IPTV), high speed data (HSD), passive optical network (PON) data, voice over IP (VOIP) and the like. In this scheme, the head end can send and receive data from the various CDN-fiber nodes (205a) to (212) by digital modulators and electrical to optical converters (570) and optical wavelength multiplexers (501a) (500b) and demultiplexers (501b) (500a). Additionally, through the use of A/D converters (563), and electrical to optical converters and digital modulators (564), the system can also carry downstream legacy CATV signals (566). Similarly, through the use of suitable optical demultiplexers (501b), optical to electrical converters (501b), digital demodulators (574) and digital to analog converters (574), the head end can also handle upstream legacy CATV signals as well.

In this scheme, the head end (202a) transmits the downstream optical fiber signals at various wavelengths $\lambda_{f1} \ldots \lambda_{fn}$ (f being forward here) to this particular implementation of a CDN-fiber node (205a) along optical fiber (218a). The head end (202a) in turn receives upstream optical fiber signals at various wavelengths $\lambda_{r1} \ldots \lambda_{rn}$ from the CDN-fiber node (205a) along optical fiber (218b).

In this scheme, once at the CDN-fiber node (205a), the downstream optical fiber signals (218a) are first demultiplexed using optical demultiplexer (500a) into three types of signals. One type, handled by digital demodulator and optical to electrical signal converter (550) is intended for CATV RF transmission at 1 GHz+ frequencies to the various upstream Coax Domain Nodes (272). This is handled by transceiver (512) and sent to the portion (518a) of the triplex unit (518) that handles 1 GHz+ signals, and this data is transmitted upstream to the various CDN units (272) along the wideband communications pathway (270u).

In this scheme, some of the downstream optical fiber signals intended for transmission to any local domain households (e.g. 209) on, for example, the 54-865 MHz RF frequency band can also be extracted from demultiplexer (500a), handled by digital demodulator and optical to electrical converter (552), converted to suitable analog waveforms by D/A converter (553) and merged with any other locally generated RF signals generated by CMRTS QAM Edge module (514a) (to be discussed). These merged signals are then sent to the roughly (54-865 MHz) arm (518b) of triplex (518).

Alternatively or additionally, often some or all of the local domain CATV RF signals in the roughly 54-865 MHz region may be generated by the <1 GHz RF signal synthesizer (514), here represented as the CMRTS QAM Edge module synthesizer/receiver (514a).

In some embodiments, the triplex unit (518) can be adjusted to not block (e.g. pass) some signals in the 54-865 MHz region (e.g. have a narrowpass filter). In these schemes, then broadcast signals being sent downstream or forward to multiple domains can pass through path (552), (553), (568), while more domain specific narrowcast signals can go through path (556), (554), (514a). However it should be appreciated that this scheme is quite flexible, and alternative broadcast/narrowcast allocation schemes may also be used.

Upstream signals, here assumed to be local domain upstream signals in the roughly 5-42 MHz upstream RF frequency sent by local domain devices (209), can be split off by triplex (518) along arm (518c), and either sent to QAM edge module (514a) for signal extraction and upstream transmission along path (558) to optical multiplexer (500b). Alternatively some or all of the local domain upstream signals can be simply converted by A/D converter (560), modulated to digital signals by digital modulator and electrical to optical converter (562), again handled by optical multiplexer (500b), and sent upstream as optical signals at various wavelengths along optical fiber (218b).

Often however, the upstream signals from more distant domains will be traveling as 1 GHz+ CATV RF signals along wideband communications pathway (270u). As a result, these upstream signals will often be segregated by triplex (518) along arm (518a) and travel back to transceiver (512). Transceiver (512) can then handle these 1 GHz+ upstream signals along path (513) and again send them upstream by (handled or not by digital modulator and electrical to optical converter (562) according to the design of transceiver design (512), by optical multiplexer (500b) along optical fiber path (218b).

Figure 5C:
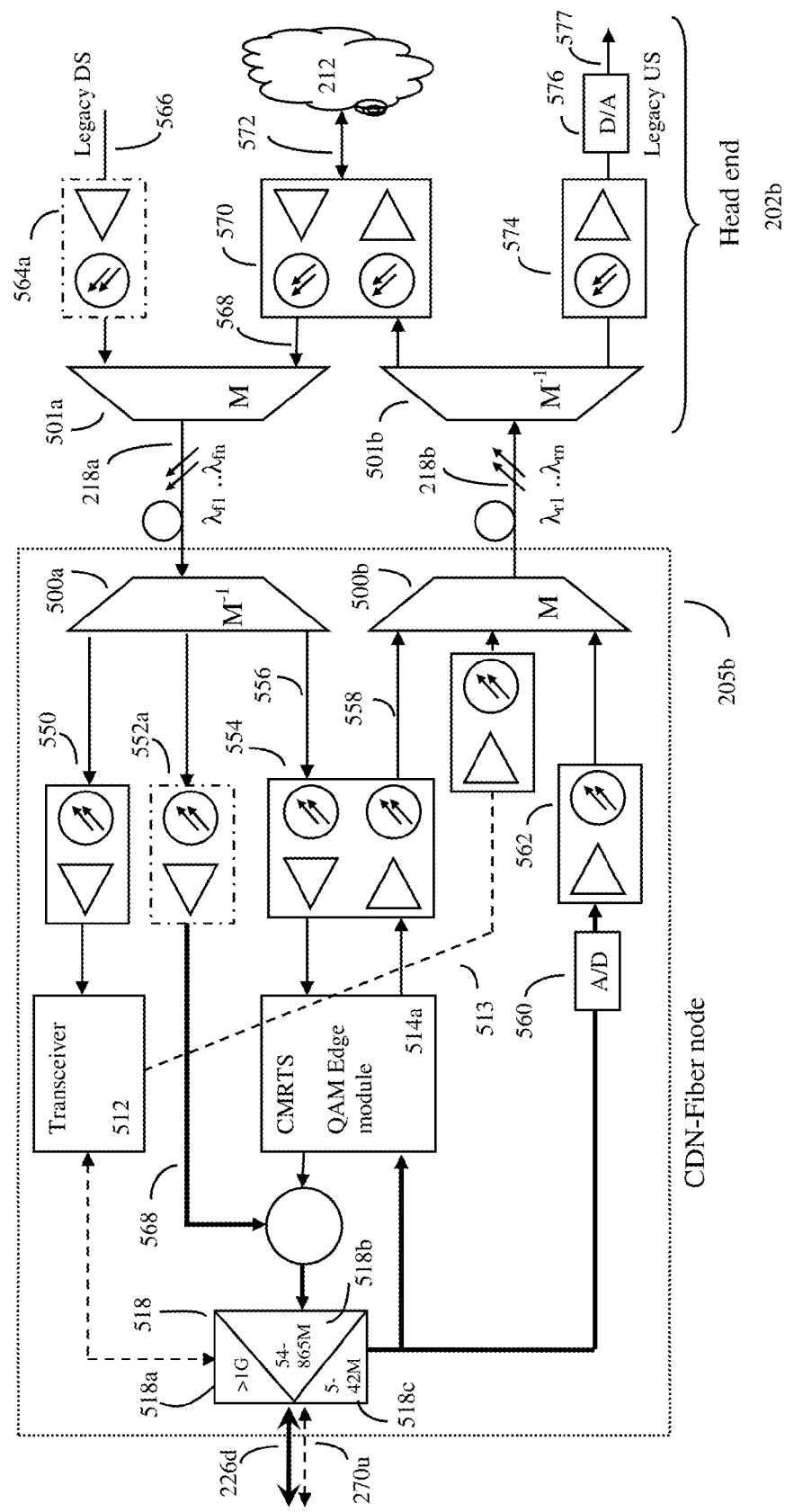
FIG. 5C shows a block diagram that focuses on a third alternative embodiment of the optical fiber node (CDN-fiber node) and an alternative scheme in which this optical fiber node can interact with the cable head end.

FIG. 5C shows a block diagram that focuses on a third alternative embodiment of the optical fiber node (CDN-fiber node) (205b) and one scheme in which this optical fiber node can interact with a complementary embodiment of the cable head end (202b). In this embodiment, as well, the head end can again be transmitting various forms of data (212) (e.g. multiservices) such as standard definition TV (SD), high definition TV (HD) SDV, video on demand (VOD), internet protocol television (IPTV), high speed data (HSD), passive optical network (PON) data, voice over IP (VOIP) and the like. In this particular scheme as well, the head end can send and receive data from the various CDN-fiber nodes (205b) to (212) using digital modulators and optical to electrical, electrical to optical converters (570) and optical wavelength multiplexers (501a) (500b) and demultiplexers (501b), (500a).

Here, instead of using a digital modulator (564) and analog to digital converter (563) as was previously discussed in FIG. 5B, in FIG. 5C, downstream legacy CATV signals (566) are instead handled by analog modulators and electrical to optical converters (564a), by way of optical multiplexer (501a) and fiber (218a).

Similarly, through the use of suitable digital demodulators and optical to electrical converters (574), as well as optical demultiplexer (501b) and fiber (218b), and digital to analog converters (576), the head end (202b) can also handle upstream legacy CATV signals (577) as well.

In this particular scheme, the head end (202b) also transmits the downstream optical fiber signals at various wavelengths $\lambda_{f1} \ldots \lambda_{fn}$ to this particular implementation of a CDN-fiber node (205b) along optical fiber (218a). The head end (202b) receives upstream optical fiber signals at various wavelengths $\lambda_{r1} \ldots \lambda_{rn}$ from the CDN-fiber node (205b) along optical fiber (218b).

In this scheme, once at the CDN-fiber node (205b), the downstream optical fiber signals (218a) are again first demultiplexed using optical demultiplexer (500a) into three types of signals. One type, handled by digital demodulator and optical to electrical converter (550) is intended for wideband CATV RF transmission at 1 GHz+ frequencies, and this is handled by transceiver (512) and sent to the portion (518a) of the triplex unit (518) that handles 1 GHz+ signals, and this data is as before transmitted upstream to the various CDN units (272) along the wideband communications pathway (270u).

In this scheme, some of the downstream optical fiber signals intended for transmission to any local domain households (e.g. 209) on, for example, the 54-865 MHz RF frequency band can also be extracted from optical demultiplexer (500a), but instead of the previous scheme discussed in FIG. 5B, here in the FIG. 5C scheme, these signals are instead handled by analog demodulator and optical to electrical converter (552a) and again merged with any locally generated RF signals generated by CMRTS QAM Edge module (514a), and sent to the roughly (54-865 MHz) arm (518b) of triplex (518).

As before, alternatively or additionally, often some or all of the local domain upstream CATV RF signals in the roughly 54-865 MHz region may be generated by the <1 GHz RF signal synthesizer (514), here again in the form of synthesizer/receiver CMRTS QAM Edge module (514a).

As before, in some schemes, the triplex unit (518) can be adjusted to not block (e.g. pass) some signals in the 54-865 MHz region (e.g. have a narrowpass filter). In these schemes, then broadcast signals being sent downstream or forward to multiple domains can pass through path (552a), (568), while more domain specific narrowcast signals can go through path (556), (554), (514a). However it should be appreciated that as before, this scheme is quite flexible, and alternative broadcast/narrowcast allocation schemes may also be used.

As before, upstream signals, here assumed to be local domain upstream signals in the roughly 5-42 MHz upstream RF frequency such as those sent by local domain devices (209) can be split off by triplex (518) along arm (518c), and either sent to QAM edge module (514a) for signal extraction and upstream transmission along path (558) to optical multiplexer (500b). Alternatively some or all of the local domain upstream signals can again be simply converted by A/D converter (560), modulated to digital signals by digital modulator and electrical to optical converter (562), again handled by optical multiplexer (500b), and sent upstream as optical signals at various wavelengths along optical fiber (218b).

As before, often however, the upstream signals from more distant domains will be traveling as 1 GHz+ CATV RF signals along wideband communications pathway (270u). As a result, these upstream signals will be segregated by triplex (518) along arm (518a) and travel back to transceiver (512). Transceiver (512) can then handle these 1 GHz+ upstream signals along path (513) and again send them upstream by (handled or not by digital modulator (562) according to the transceiver design (512), by optical multiplexer (500b) along optical fiber path (218b).

Figure 5D:
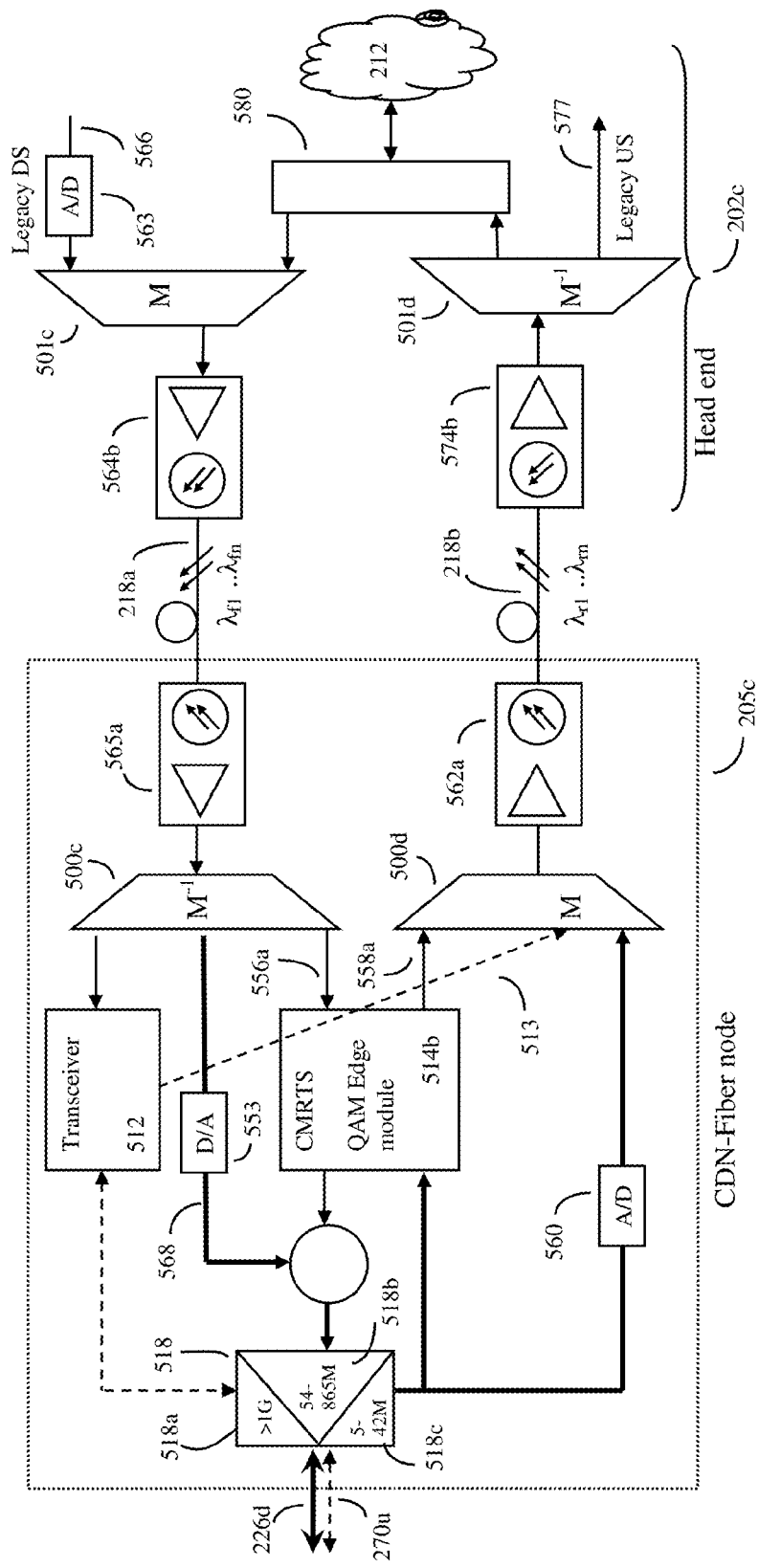
FIG. 5D shows a block diagram that focuses on a fourth alternative embodiment of the optical fiber node (CDN-fiber node) and an alternative scheme in which this optical fiber node can interact with the cable head end.

FIG. 5D shows a block diagram that focuses on a fourth alternative embodiment of the optical fiber node (CDN-fiber node) (205c) and one scheme in which this optical fiber node can interact with a complementary embodiment of the cable head end (202c). In this embodiment, as well, the head end can again be transmitting various forms of data (212) (e.g. multiservices), again such as standard definition TV (SD), high definition TV (HD) SDV, video on demand (VOD), internet protocol television (IPTV), high speed data (HSD), passive optical network (PON) data, voice over IP (VOIP) and the like., here through switch (580). In this particular scheme as well, the head end can send and receive data from the various CDN-fiber nodes (205c) by digital modulators and electrical to optical converters (564b) and electronic digital multiplexers (501c), (500d) and demultiplexers (500c) (501d).

In FIG. 5D, downstream legacy CATV signals (566) are instead handled by analog to digital converters (563) and sent to electronic multiplexer (501c), and the electrical signals are then transduced to optical signals by digital modulator and electrical to optical converter (564b).

Similarly, through the use of suitable digital demodulators and optical to electrical converters (574b), as well as digital electronic demultiplexer (501d) and fiber (218b), the head end (202c) can also handle upstream legacy CATV signals (577) as well.

In this particular scheme, the head end (202c) transmits the downstream optical fiber signals at various wavelengths $\lambda_{f1} \ldots \lambda_{fn}$ to this particular implementation of a CDN-fiber node (205c) along optical fiber (218a). The head end (202c) receives upstream optical fiber signals at various wavelengths $\lambda_{r1} \ldots \lambda_{rn}$ from the CDN-fiber node (205c) along optical fiber (218b).

In this scheme, once at the CDN-fiber node (205c), the downstream optical fiber signals (218a) are first converted from optical to digital electronic signals by digital demodulator and optical to electrical converter (565a) and demultiplexed using digital electronic demultiplexer (500c) into three types of signals again. As before, one signal is intended for wideband CATV RF transmission at 1 GHz+ frequencies, and this is again handled by transceiver (512) and sent to the portion (518a) of the triplex unit (518) that handles 1 GHz+ signals, and this data is as before transmitted upstream to the various CDN units (272) along the wideband communications pathway (270u).

In this scheme, as before, some of the downstream optical fiber signals intended for transmission to any local domain households (e.g. 209) on, for example, the 54-865 MHz RF frequency band can also be extracted from demultiplexer (500c), but instead of the previous schemes, here in the FIG. 5C scheme, these are handled by digital to analog converter (553) and again merged with any locally generated RF signals generated by CMRTS QAM Edge module (514b), and sent to the roughly (54-865 MHz) arm (518b) of triplex (518).

As before, alternatively or additionally, often some or all of the local domain CATV RF signals in the roughly 54-865 MHz region may be generated by the <1 GHz RF signal synthesizer (514), here in the form of synthesizer/receiver CMRTS QAM Edge module (514*b*).

As before, in some schemes, the triplex unit (518) can be adjusted to not block (e.g. pass) some signals in the 54-865 MHz region (e.g. have a narrowpass filter). In these schemes, broadcast signals being sent downstream or forward to multiple domains can pass through the path that goes through (553), (568), while more domain specific narrowcast signals can go through path (556*a*) and (514*b*) to (518*b*). However it should be appreciated that as before, this scheme is quite flexible, and alternative broadcast/narrowcast allocation schemes may also be used.

As before, upstream signals, here assumed to be local domain upstream signals in the roughly 5-42 MHz upstream RF frequency sent by local domain devices (209) can be split off by triplex (518) along arm (518*c*), and either sent to QAM edge module (514*b*) for signal extraction and upstream transmission along path (558*a*) to digital electronic multiplexer (500*d*) and from there to digital modulator and electrical to optical converter 562*a*. Alternatively some or all of the local domain upstream signals can be digitized by A/D converter (560), handled by digital electronic multiplexer (500*d*), digitally modulated to optical signals by digital modulator and electrical to optical converter (562*a*), and sent upstream as optical signals at various wavelengths along optical fiber (218*b*).

As before, often however, the upstream signals from more distant domains will be traveling as 1 GHz+ CATV RF signals along wideband communications pathway (270*u*). As a result, these upstream signals will be segregated by triplex (518) along arm (518*a*) and travel back to transceiver (512). Transceiver (512) can then handle these 1 GHz+ upstream signals along path (513) and again send them upstream by (handled or not by digital modulator (562*a*) according to the transceiver design (512), by multiplexer (500*d*) along optical fiber path (218*b*).

Figure 6:
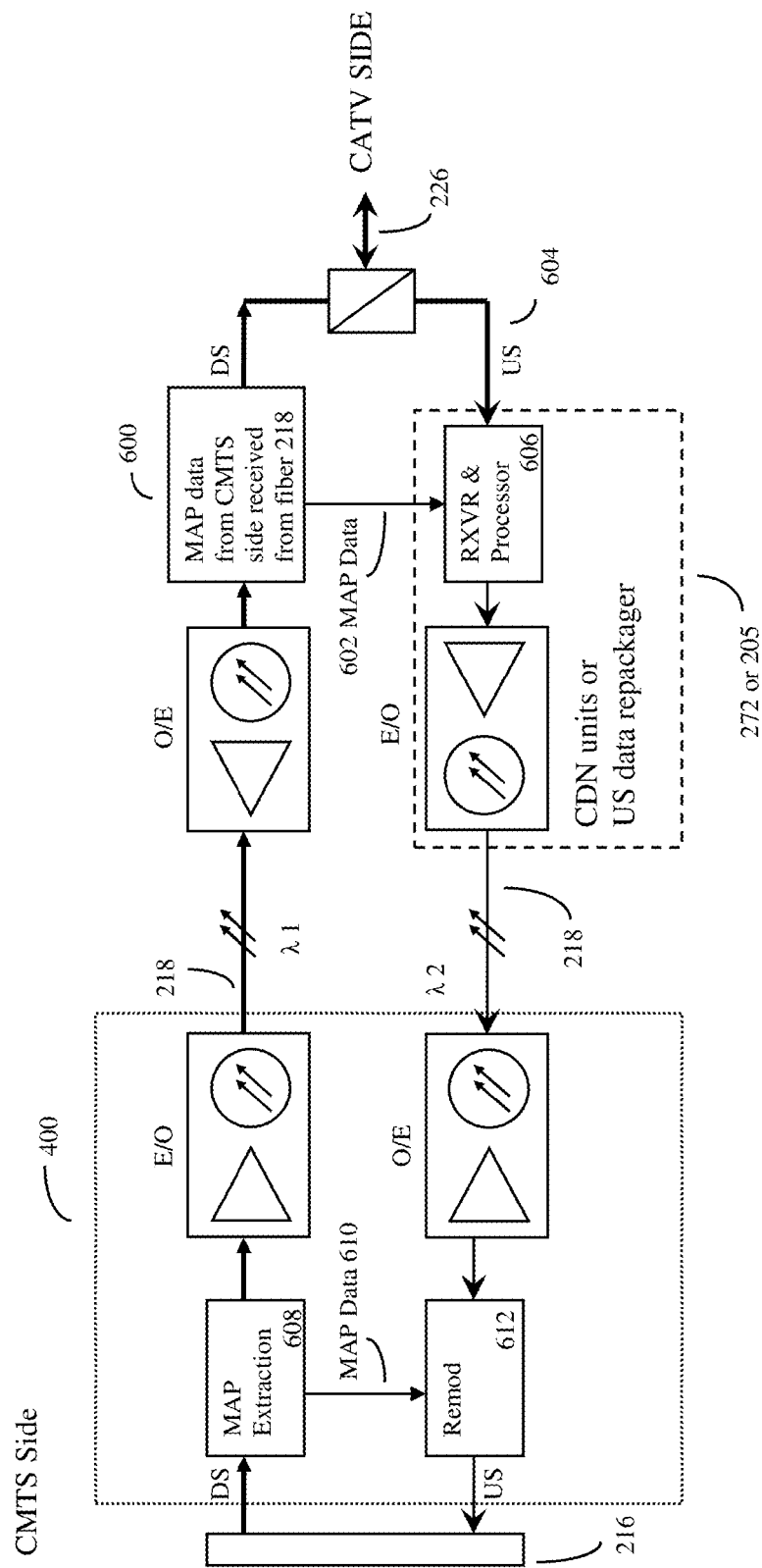
FIG. 6 shows an overview of how, in some embodiments of the invention, Mini-slot Allocation Packet (MAP) data may be used to analyze and extract the digital data encoded by the upstream signals. The upstream digital data may then be sent back to the cable head and the Cable Modem Termination System (CMTS) at the cable head using a more efficient digital protocol, such as a GigE protocol, first along the 1 GHz+ wideband communications pathway, and then after the optical fiber node along the HFC optical fiber. Once at the fiber node, this upstream data can either be sent at a different wavelength from the downstream optical fiber signal, or alternatively can be sent back along a different optical fiber. At the cable head CMTS end as desired, the same MAP data may be used, in conjunction with the digital data, to reconstitute the original upstream CATV RF signal, and this in turn may be fed into a legacy CMTS.

FIG. 6 shows an overview of how Mini-slot Allocation Packet (MAP) data (600), (602) may be used to analyze and extract the digital data encoded by the upstream signals (604). This process of analysis and digital data extraction may be done at different locations, such as at the Coax Domain Nodes (272), or alternatively (particularly if the Coax Domain Nodes simply pass along all upstream data without processing) at or near the CDN-fiber node (205). This step can be performed by a processor or DSP (606) that receives the upstream data, and uses the MAP data (602) to understand the timing and assignment of the various time slices used to convey the upstream data from the various cable modems at the various neighborhood households.

The upstream digital data may then be sent back to the cable head and the Cable Modem Termination System (CMTS) (216) at the cable head using a more efficient digital protocol, such as a GigE protocol, along the HFC optical fiber (218). At the CMTS end (216) as desired, the same MAP data (608) (610) may be used, in conjunction with the digital data (and possibly in decoder apparatus (400)) to reconstitute the original upstream CATV RF signal at a remodulator (612). This reconstituted upstream signal may in turn be fed into the CMTS (216), which may be a legacy CMTS, as desired. This helps leverage the cable industry's considerable investment in standard DOCSIS equipment, and helps reduce the costs and effort involved in providing additional functionality to the system's various users. Alternatively, when more advanced CMTS systems that are designed to directly interpret the upstream data are used, remodulation step (612) may be omitted.

Map extraction may be done by various methods. Since the CMTS processor generates MAP data, one of the simplest methods is simply to modify the CMTS processor software to send out (downstream) an easy to interpret form of the MAP data for use by the system, and communicate this MAP data down optical fiber (218) to the processor (606) that will be analyzing the neighborhood upstream data. Alternatively, less direct methods, such as sniffing methods discussed in Azenko and Rakib, U.S. Pat. No. 7,362,773 (incorporated herein by reference) may be used. In general, a broad range of alternative MAP extraction methods may be used for the invention. Often, however, it will be useful to extract the MAP data at the cable head end, and transmit this MAP data to the optical nodes (205) and Coax Domain Nodes (272) at the CATV RF side of the system.

As one alternative MAP scheme, the MAP data may not be used for demodulating the upstream data at all, but rather simply be used to mask or "clean up" the upstream data. Here for example, the RF bursts sent out by various cable modems during times that the MAP data has allocated for that particular cable modem's upstream transmission time can simply be passed on as is (i.e. as a pure analog to analog pass through), while during the "dead" times when the MAP data indicates that a particular cable modem or set of cable modems is not allocated time to transmit, no signal may be passed on. Thus upstream RF transmissions during time periods or windows when upstream transmission by the cable modems attached to a particular Coax Domain Node are not authorized may be masked. Here the net effect of this alternative scheme is to reduce the overall upstream noise, while preserving the upstream data. This sort of scheme can be useful in reducing interference that may be caused, for example, by inadvertent crosstalk between cable modems that are served by an alternative Coax Domain Node, but through which some signals have inadvertently leaked to a region of the CATV cable served by a different Coax Domain Node.

Figure 7:
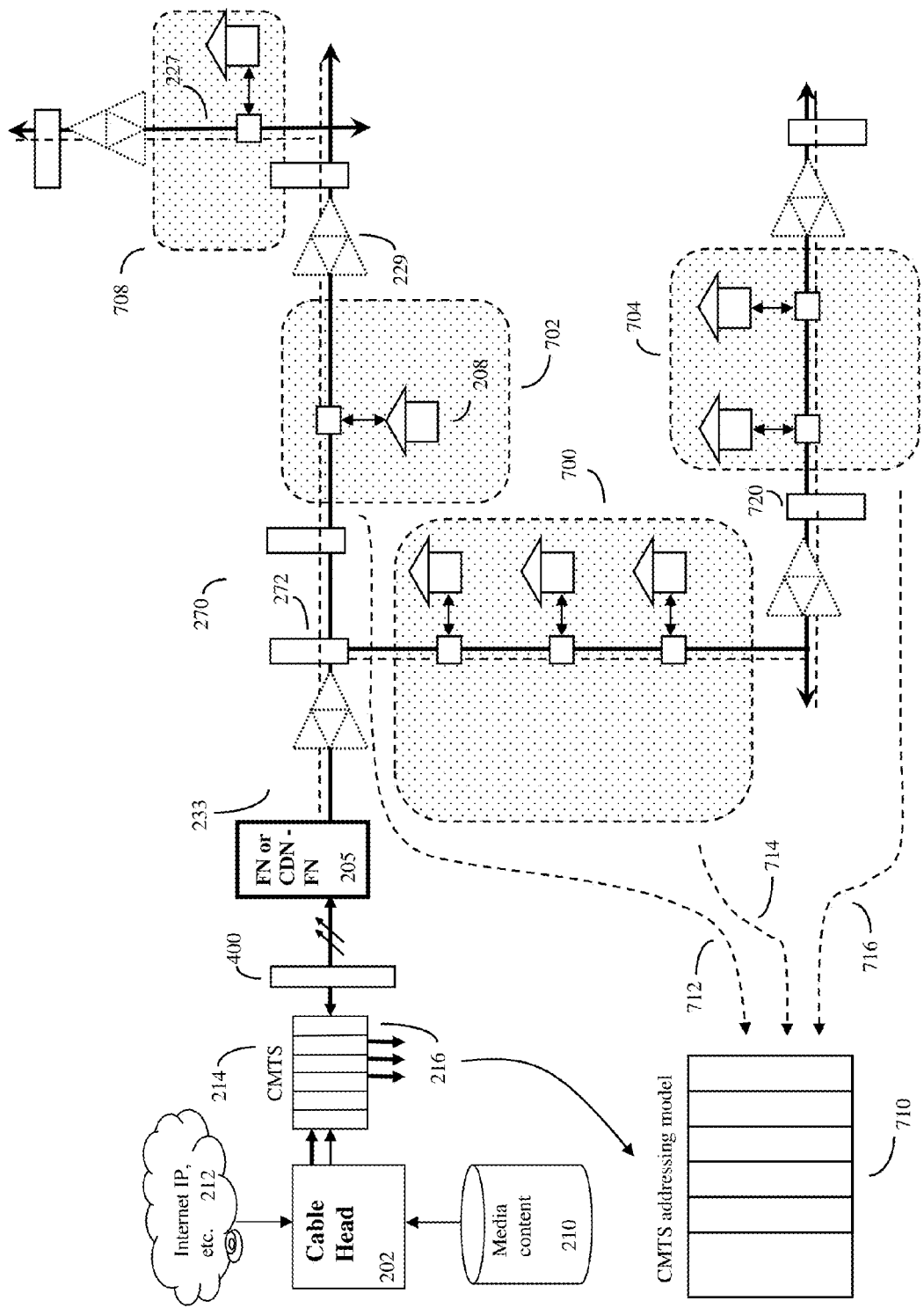
FIG. 7 shows one type of wideband communications pathway and Coax Domain Node addressing scheme. Here either each Coax Domain Node, or in some embodiments related groups of Coax Domain Nodes may be partitioned into different domains, and the communications devices (e.g. cable modems and other devices) served by their respective Coax Domain Node can be addressed by the cable plant or head end CMTS accordingly. In one simple scheme, the household communications devices falling within each Coax Domain Node domain may be handled by the CMTS as if they were simply small independent neighborhoods, thus partitioning what is really a larger CATV coax neighborhood into multiple virtual smaller neighborhoods. This scheme helps preserve backward compatibility with legacy CMTS and CMTS software.

FIG. 7 shows one wideband communications pathway and Coax Domain Node addressing scheme. Here either each Coax Domain Node, or in some embodiments related groups of Coax Domain Nodes are partitioned into different domains (700), (702), (704), (708), and the cable modems in the various households (e.g. 208) served by their respective Coax Domain Nodes (272) are addressed by the cable plant or head end CMTS accordingly. In one simple scheme, the various communication devices (e.g. household cable modems) falling within each Coax Domain Node domain are handled by the CMTS as if they were simply small independent neighborhoods, thus partitioning what is really a larger CATV coax neighborhood into multiple virtual smaller neighborhoods. This scheme helps preserve backward compatibility with legacy CMTS and CMTS software.

Here the addressing model used by CMTS (214) is shown as (710). Although the various domains (700, 702, 704, 708) served by the neighborhood CATV cable served by Fiber Node or CDN-Fiber node (205) are actually part of the same CATV coax system, for purposes of at least handling the upstream data, the addressing scheme used by the CMTS (710) can treat these various domains (700, 702, 704, 708) as if they were simply small independent neighborhood CATV cables, each connecting to the CMTS by their own respective slots (712, 714, 718). This scheme helps preserve legacy CMTS hardware and software, as well as other legacy cable head systems. Alternative domain addressing schemes may also be used.

Thus here, the CATV trunk cable or branch CATV cables, and the various Coax Domain Nodes can be addressed as multiple domains, so that one set of cable devices (such as cable modems) attached the CATV trunk and branch cable arrangement that is local to and served by a first Coax Domain Node (e.g. 720) may be addressed on a first domain basis (e.g. domain 704), and other sets of cable devices attached to said at least one CATV trunk cable or at least some of said plurality of branch CATV cables that is local to and serviced by a second Coax Domain Node (e.g. 272) may be addressed on a second domain basis (e.g. domain 700).

Although often it will be convenient to designate each group of households served by a particular Coax Domain Node as having its own unique address or CMTS slot, in alternative embodiments, as desired, multiple domains may be combined and addressed as a unit. Thus for example in an alternative scheme, domains (700) and (704) might be addressed as a single "virtual neighborhood CATV cable" by the CMTS (214, 710), while domains (702) and (708) might be addressed as a different "virtual neighborhood CATV cable" by the CMTS (214, 710). Although potentially limiting the upstream data rate capability, such domain pooling arrangements may be useful for simplifying addressing schemes, preserving compatibility with legacy CMTS and other equipment which may have a limited number of available slots or neighborhood ports, and for other purposes as well.

In at least some embodiments, it may be useful to endow the Coax Domain Node with at least one processor and software that enables the Coax Domain Node to keep track of exactly which communication devices are within the sphere of coverage or domain of that particular Coax Domain Node. This simplifies management and control of the system.

Figure 8:
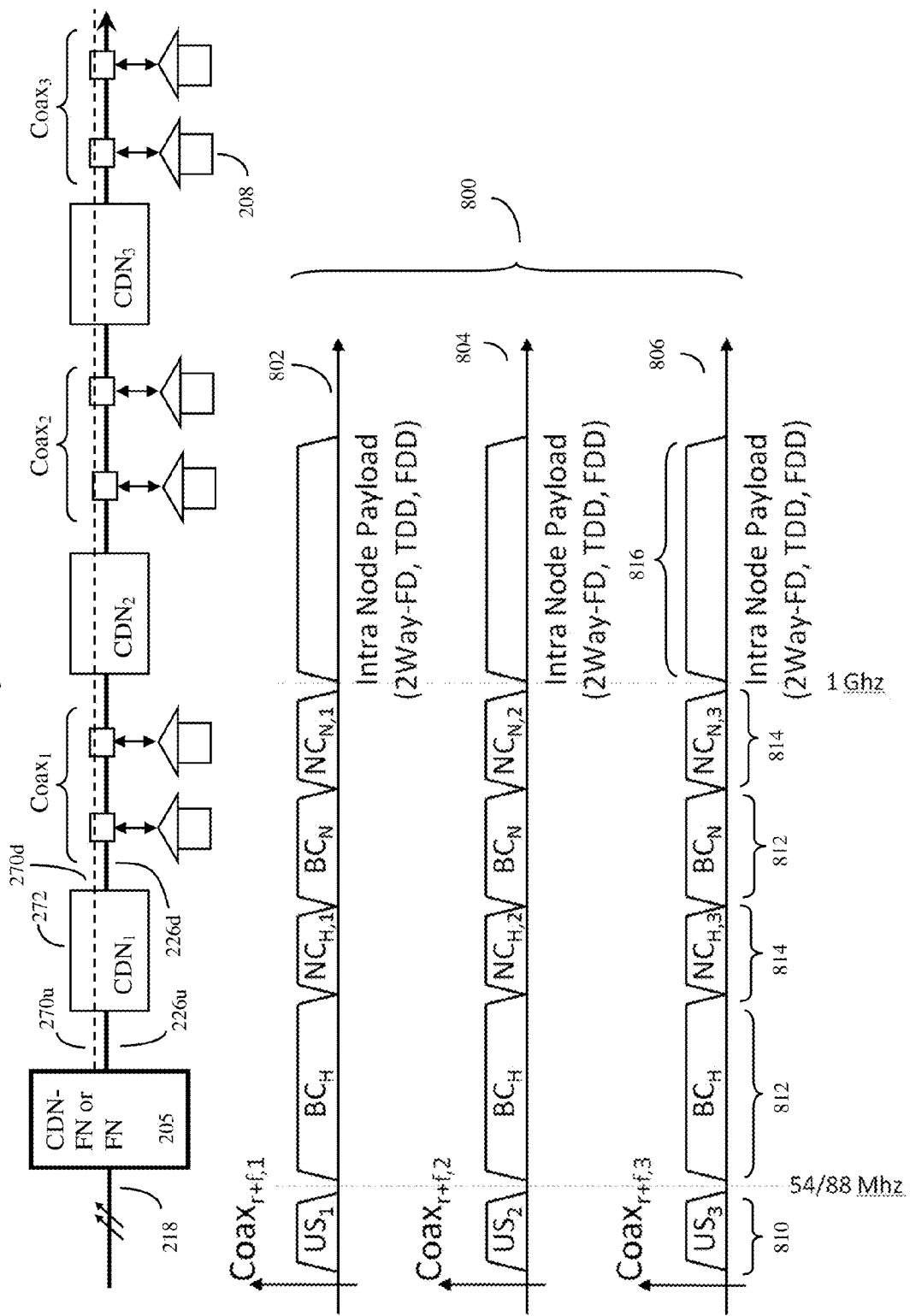
FIG. 8 shows one scheme in which the Coax Domain Nodes may allocate frequency and payloads among the various coax cable domains.

FIG. 8 shows one scheme in which the Coax Domain Nodes may allocate frequency and payloads among the various coax cable domains.

In this example, by virtue of the fact that the various Coax Domain Nodes ($CDN_1$, $CDN_2$, $CDN_3$) generally only pass the high frequencies (e.g. 1 GHz+, or at least above the upstream frequencies of 5-42/88 MHz, the Coax Doman Nodes end up segmenting the CATV coax into various domains, here called $Coax_1$, $Coax_2$, and $Coax_3$, and so on. Particularly in the case where the Coax Domain Nodes are set to filter various bandwidths of RF signals below about 1 GHz, then as can be seen in the frequency map (800), the RF signals in each domain can be different.

In this example, the Coax Domain Nodes (272) are configured as previously shown in FIG. 5A, and have triplex units such as (530) and (532). These triplex units only allow frequencies above about 1 GHz to pass (816) (boosted, relayed, or modified as appropriate by the add drop multiplexer ADM repeater (534)). The triplex units intercept and terminate all signals from about 0-5 MHz to about 865 MHz-1 GHz.

Thus, within each domain Coax1, Coax2, Coax3, both the standard CATV upstream RF signals from about 5-54 or 88 MHz (810) are isolated from the other domains, and the standard CATV downstream RF signals (812), (814) are isolated from the other domains. Only the 1 GHz+ frequencies (816) pass between domains in a relatively free manner. (Note in some alternative schemes, certain "notch" frequencies less than 1 GHz may also be allowed to freely pass or be relayed as desired).

With this scheme, then within the $Coax_1$ domain, the frequency allocation (802) is such that the upstream RF signals (originating from various communications devices connected to $Coax_1$) from say 0-54/88 MHz ($US_1$) are confined to the $Coax_1$ domain. Similarly the upstream signals in the other $Coax_2$ and $Coax_3$ domains (804), (806) are also confined to their domains because they are terminated by the respective Coax Domain Nodes $CDN_1$, $CDN_2$, and $CDN_3$. Thus each upstream channel $US_1$, $US_2$, and $US_3$ in this scheme is unique. The only way that the upstream data can make it back to the CDN-fiber node (205) and hence to the cable head end is if the various Coax Domain Nodes repackage it and upconvert it to a higher frequency such as the 1 GHz+ frequency (816).

The various Coax Domain Nodes can be set to extract the same set of data (e.g. channels) from the 1 GHz+ wideband pathway (270), and send this as the same general broadcast channels BCH (812) across all domains (e.g. 802, 804, 806). Alternatively the Coax Domain Nodes can be set to extract different types of data (e.g. different channels) from the 1 GHz+ wideband pathway (270), and narrowcast this (814) to different selected domains. This can be done by, for example, sending the appropriate commands to the ADM repeater (534) and <1 GHz RF signal synthesizer (536) to extract the appropriate data and QAM modulate or other modulate and transmit downstream as desired.

Thus the only way that there will be RF signals and data on these frequencies (e.g. the 54/88 MHz to about 865 to 1 GHz range) is if the various Coax Domain Nodes select data that is passed along (e.g. 1 GHz+ wideband frequencies (816), and using their RF signal synthesizers (536) create signals in these wavelength bands (812), (814), and inject this into their various domains.

The narrowcast signals (814) generated at that particular CDN node can be of various types. For example, they can include data, voice or video over IP data addressed to a household in that particular domain for the various domains ($NC_{N,1}$, $NC_{N,2}$, and $NC_{N,3}$).

As previously discussed, in the 1 GHz+ wideband frequency range (816), data intended to flow freely across domains is transmitted. This data can consist of the intra node payload, and can be transmitted in various formats such as 2-Way frequency division (2-Way-FD), Time division duplex (TDD), Frequency division duplex (FDD), and other formats as desired.

Figure 9:
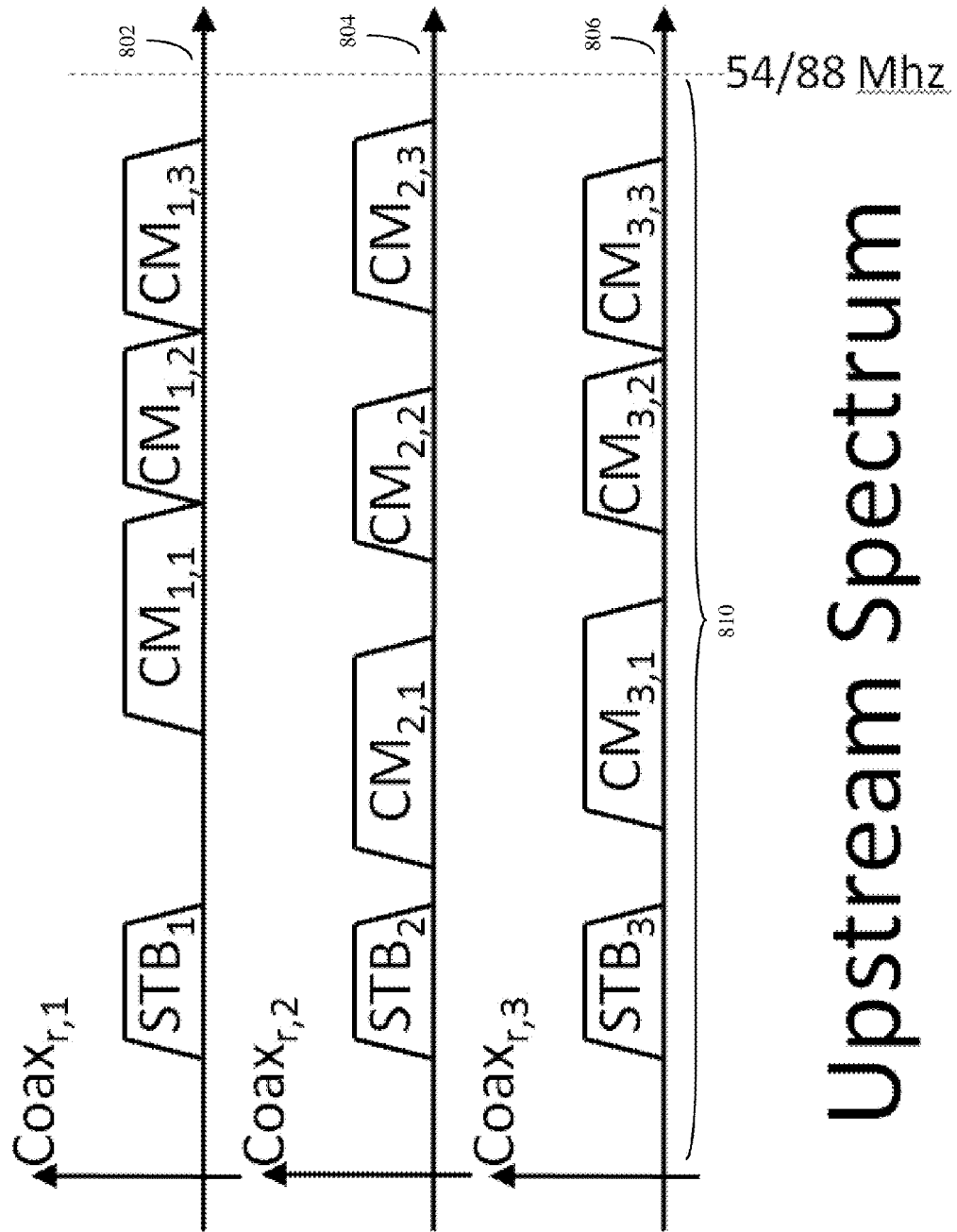
FIG. 9 shows a detail of one scheme in which the Coax Domain Nodes may allocate upstream frequencies and payloads among the various coax cable domains. Note that in this scheme, because the different domains are isolated from each other in the downstream frequency region (e.g. 5-42 MHz or 5-88 MHz), these frequency and time slices need not be consistent between the different domains, even though the domains all fall at various locations along the same neighborhood CATV cable.

FIG. 9 shows a detail of one scheme in which the Coax Domain Nodes may allocate upstream frequencies and payloads among the various coax cable domains. Note that in this scheme, because the different domains are isolated from each other in the downstream frequency region (e.g. 5-42 MHz or 5-88 MHz) (810) these frequency and time slices need not be consistent between the different domains, even though the domains all fall at various locations along the CATV cable. Thus for example, Set top boxes $STB_1$, $STB_2$, $STB_3$ can all transmit upstream at the same time and frequency, as well as Cable Modems $CM_{1,1}$, $CM_{2,1}$, $CM_{3,1}$, $CM_{2,1}$, $CM_{2,2}$, $CM_{3,3}$, $CM_{3,1}$, $CM_{3,2}$, and CM 3,3 without having to compensate for devices transmitting upstream in the other domains. The net effect is to greatly reduce congestion and improve upstream communications speeds.

Figure 10:
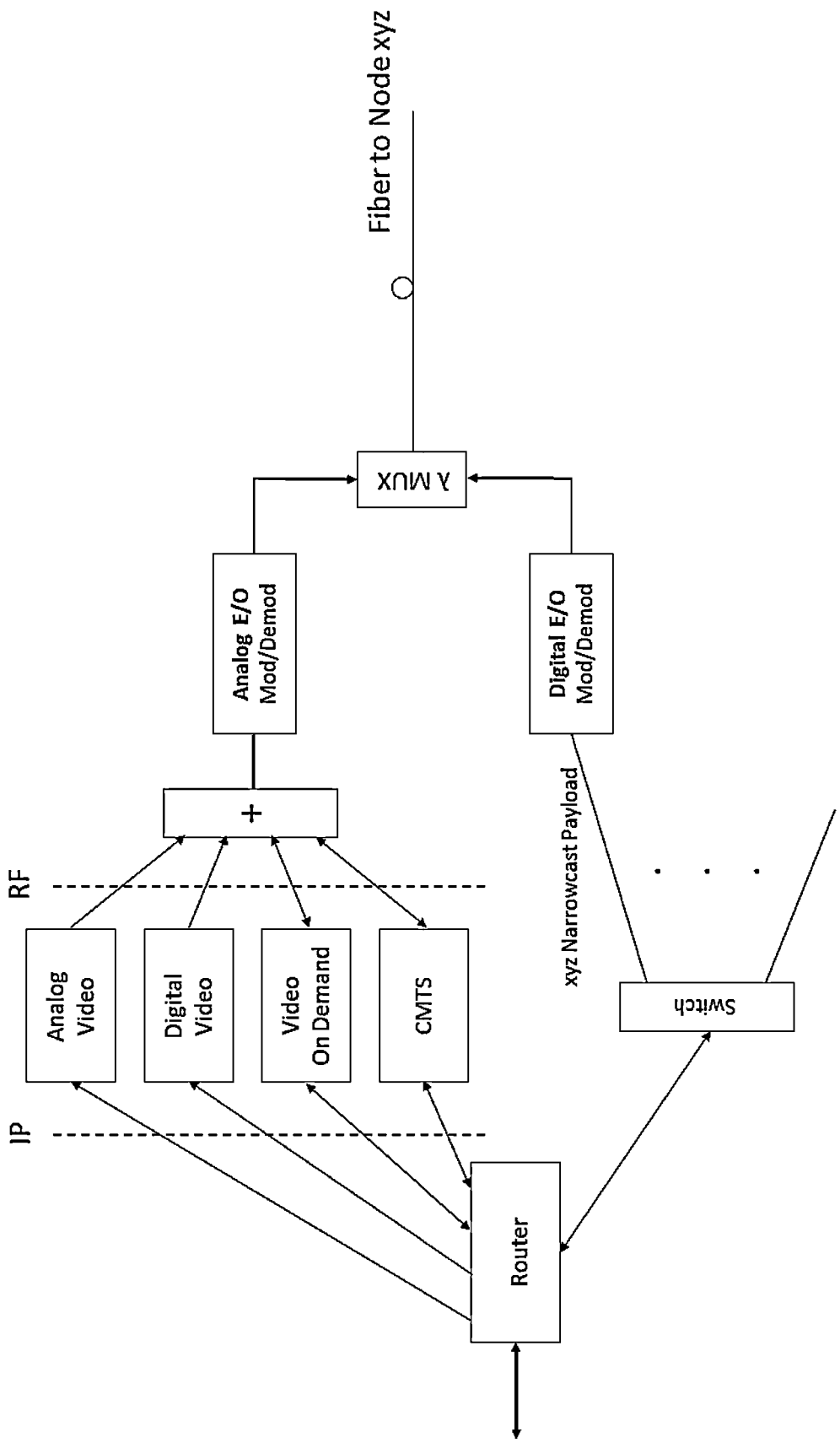
FIG. 10 shows a schematic of how the cable head end can, with the aid of a suitable router, take various forms of data in IP space, such as analog video, digital video, video on demand, as well as other signals generated by the head end cable modem termination system (CMTS), modulate this to analog optical signals, add various types of narrowcast payloads (in digital format), multiplex these, and transmit as various optical signals over the optical fiber to various optical fiber nodes.

FIG. 10 shows a schematic of how the cable head end can, with the aid of a suitable router, take various forms of data in IP space, such as analog video, digital video, video on demand, as well as other signals generated by the head end cable modem termination system (CMTS), modulate this to analog optical signals, add various types of narrowcast payloads (in digital format), multiplex these, and transmit (and receive) as various optical signals over the optical fiber to various optical fiber nodes.

Figure 11:
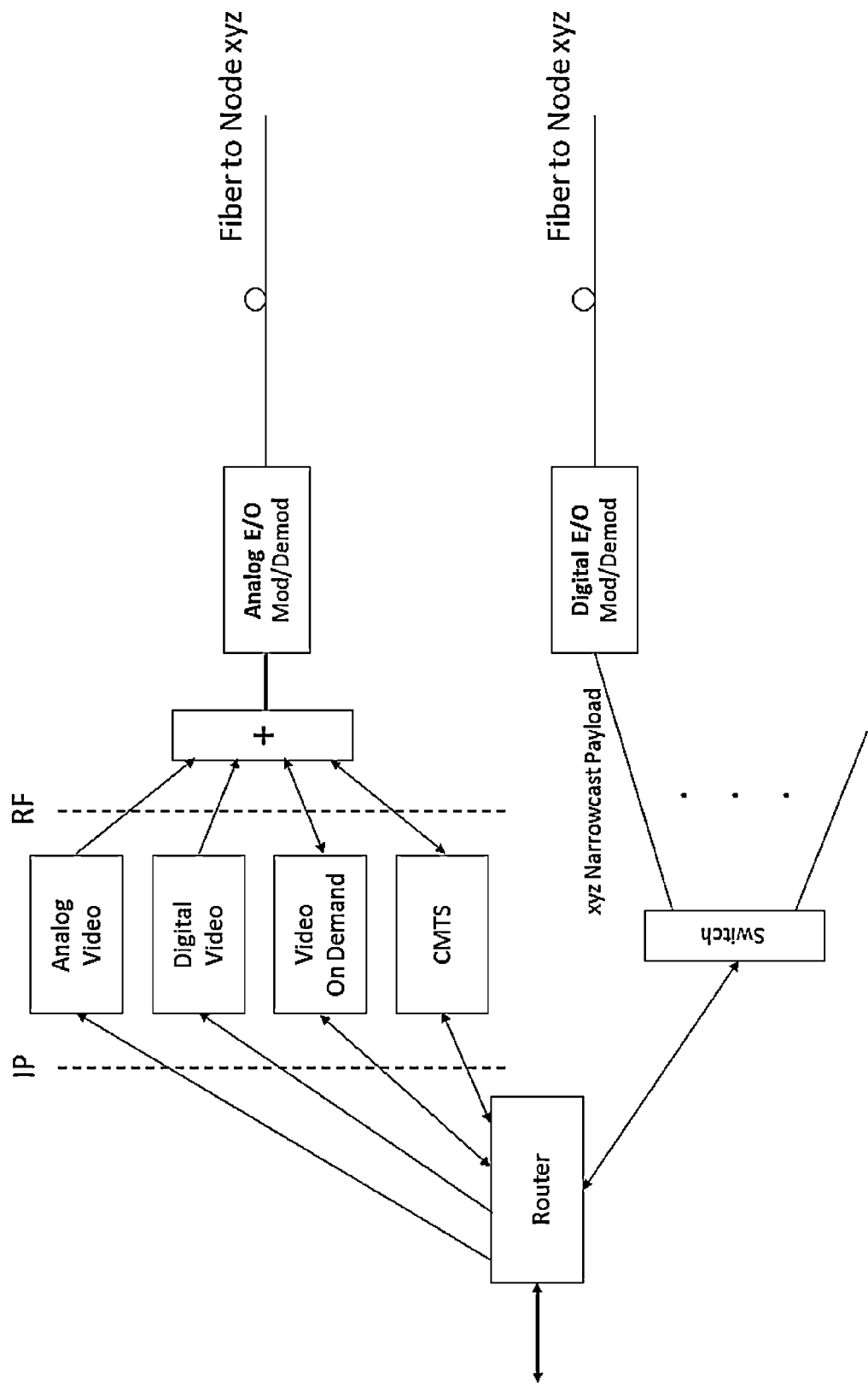
FIG. 11 shows an alternative scheme of how the cable head end can, with the aid of a suitable router, take various forms of data in IP space, such as analog video, digital video, video on demand, as well as other signals generated by the head end cable modem termination system (CMTS), modulate this to analog optical signals, add various types of narrowcast payloads (in digital format), multiplex these, and transmit as various optical signals over the optical fiber to various optical fiber nodes. In this alternative scheme, the narrowcast signals (narrowcast payload) can be sent using presently unused optical fibers (e.g. dark fiber).

FIG. 11 shows an alternative scheme of how the cable head end (e.g. 205) can, with the aid of a suitable router, take various forms of data in IP space, such as analog video, digital video, video on demand, as well as other signals generated by the head end cable modem termination system (CMTS), modulate this to analog optical signals, add various types of narrowcast payloads (in digital format), multiplex these, and transmit (and receive) as various optical signals over the optical fiber to various optical fiber nodes. In this alternative scheme, the narrowcast signals (narrowcast payload) can be sent using presently unused optical fibers (e.g. dark fiber).

The invention claimed is:

1. A method for enhancing data carrying capacity of a hybrid fiber cable (HFC) network with a cable head end, at least one optical fiber, at least one optical fiber node terminating on at least one cable television (CATV) cable, said CATV cable connected to a plurality of branch CATV cables thus forming a CATV Tree and Branch Network, and a plurality of communication devices connected to said CATV Tree and Branch Network, said method comprising:

creating a bidirectional wideband communications pathway mediated by radio frequencies (RF) of approximately 1 GHz or greater between said at least one optical fiber node and to and between a plurality of Coax Domain Nodes disposed along said CATV Tree and Branch network;

wherein said Coax Domain Nodes are junctions in said CATV Tree and Branch network, and pass CATV RF signals of approximately 1 GHz frequency or more, but intercept and terminate at least some CATV RF signals of approximately 1 GHz frequency or less;

at least some of said plurality of Coax Domain Nodes also communicating with their own set of local CATV cable connected communications devices on a local domain specific basis;

using said Coax Domain Nodes to

A: intercept local upstream CATV RF signals from said communications devices, said local upstream CATV RF signals having a frequency of approximately 1 GHz or less, B: terminate at least some of said local upstream CATV RF signals;

C: modulate either said local upstream CATV RF signals or data obtained from said local upstream CATV RF signals to an RF frequency of approximately 1 GHz or more;

D: and backhaul either said local upstream CATV RF signals or data obtained from said local upstream CATV RF signals to said at least one optical fiber node using said wideband communications pathway; and E: using said Coax Domain Nodes and data obtained from said wideband communications pathway, to transmit domain specific downstream data to said local CATV cable connected communications devices by modulating and transmitting at least selected portions of said data obtained from said wideband communications pathway using downstream CATV RF signals of approximately 1 GHz or less.

2. The method of claim 1, wherein said upstream CATV RF signals of approximately 1 GHz frequency or less comprise signals selected from the group consisting of Data Over Cable Service Interface Specification (DOCSIS), Digital Video Broadcasting (DVB), Aloha, and other non-DOCSIS signals, and wherein at least some of said DOCSIS signals are terminated by said Coax Domain Nodes and backhauled using said wideband communications pathway.

3. The method of claim 1, wherein all of said upstream CATV RF signals of approximately 1 GHz frequency or less are terminated by said Coax Domain Nodes and backhauled using said wideband communications pathway.

4. The method of claim 1, wherein said wideband communications pathway comprises CATV cable, CATV cable connectors and/or active devices capable of passing through frequencies of 1 GHz and higher, and amplifiers capable of overcoming the attenuation of RF frequencies of approximately 1 GHz or greater as a function of CATV cable distance.

5. The method of claim 4, wherein said wideband communications pathway, when said Coax Domain Nodes are bypassed, is further capable of passing through at least some RF frequencies between 5 to 865 MHz.

6. The method of claim 1, wherein said Coax Domain Nodes operate by the steps of:

1: digitizing at least some of said upstream CATV RF signals of approximately 1 GHz frequency or less;

2: modulating at least some of the digitized upstream CATV RF signals to RF frequencies of approximately 1 GHz or greater, creating wideband communications pathway signals.

7. The method of claim 6, wherein the steps of digitizing said upstream CATV RF signals of approximately 1 GHz frequency or less are done by the steps of:

A: obtaining Mini-slot Allocation Packet (MAP) data for at least some of said upstream CATV RF signals;

B: using said Mini-slot Allocation Packet (MAP) data to demodulate and extract at least some of the upstream digital information carried by at least some of said upstream CATV RF signals;

C: repackaging said upstream digital information in an alternative format for transmission using RF frequencies of approximately 1 GHz or greater; and D: transmitting said upstream digital information in said alternative format using said Wideband communications pathway.

8. The method of claim 7, further using said Mini-slot Allocation Packet (MAP) data to subsequently remodulate said upstream digital information into reconstituted upstream CATV RF signals at said cable head, producing reconstituted upstream CATV RF signals; and supplying said reconstituted upstream CATV RF signals to a Cable Modem Termination System.

9. The method of claim 1, wherein downstream data is transmitted over said optical fiber from said Cable head end to said optical fiber node at a first wavelength, and said upstream data is transmitted from said optical fiber node to said head end over said optical fiber at a second wavelength.

10. The method of claim 1, further using said wideband communications pathway and said Coax Domain Nodes to transmit either upstream or downstream wideband communication pathway data according to a Time Division Duplex (TDD) scheme, Frequency Division Duplex (FDD) scheme, or Full Bidirectional Duplex without time or frequency division scheme.

11. The method of claim 1, wherein at least some of said Coax Domain Nodes contain at least one Quadrature Amplitude Modulated (QAM) modulator device capable of encoding, on a domain specific basis, selected portions of said downstream wideband communications pathway data into RF QAM waveforms; and wherein modulating at least selected portions of said downstream wideband communications pathway data into downstream CATV RF signals of approximately 1 GHz frequency or less at said Coax Domain Nodes is done using said at least one QAM modulator device.

12. The method of claim 1, wherein said Coax Domain Nodes further comprise:

at least one Quadrature Amplitude Modulated (QAM) modulator device capable of encoding selected portions of digitally encoded wideband communications pathway data into RF QAM waveforms of approximately 1 GHz frequency or less;

at least one software controllable switch that can be remotely directed to select, on a domain addressable basis, at least some of said digitally encoded Wideband communications pathway data and direct said at least one QAM modulator device to encode said selected digitally encoded ultrahigh frequency CATV RF communications data into RF QAM waveforms of approximately 1 GHz frequency or less at a selected set of frequencies within each said domain;

at least one remotely software controllable RF packet processor capable of detecting upstream data carried by CATV RF upstream signals waveforms of approximately 1 GHz frequency or less generated by communications device(s) within each domain, and digitally repackaging said upstream data and retransmitting said upstream data along said wideband communications pathway;

wherein said at least one software controllable switch and/or said software controllable RF packet processor are capable of being remotely configured by software to assign or reassign, on a domain specific basis, the frequencies used by said upstream data and/or downstream data being carried by RF QAM waveforms of approximately 1 GHz frequency or less.

13. A method for enhancing the data carrying capacity of a hybrid fiber cable (HFC) network with a cable head end, at least one optical fiber, at least one optical fiber node terminating on at least one cable television (CATV) cable, said CATV cable connected to a plurality of branch CATV cables thus forming a CATV Tree and Branch Network, and a plurality of communication devices connected to said CATV Tree and Branch Network, said method comprising:

creating a bidirectional wideband communications pathway mediated by radio frequencies (RF) of approximately 1 GHz or greater between said at least one optical fiber node and to and between a plurality of Coax Domain Nodes disposed along said CATV Tree and Branch network;

wherein said Coax Domain Nodes are junctions in said CATV Tree and Branch network, and pass CATV RF signals of approximately 1 GHz frequency or more, but intercept and terminate at least some CATV RF signals of approximately 1 GHz frequency or less;

at least some of said plurality of Coax Domain Nodes also communicating with their own set of local CATV cable connected communications devices on a local domain specific basis;

using said Coax Domain Nodes to

A: intercept local upstream CATV RF signals from said communications devices, said local upstream CATV RF signals having a frequency of approximately 1 GHz or less;

B: terminate at least some of said local upstream CATV RF signals;

C: modulate either said local upstream CATV RF signals or data obtained from said local upstream CATV RF signals to an RF frequency of approximately 1 GHz or more;

D: and backhaul either said local upstream CATV RF signals or data obtained from said local upstream CATV RF signals to said at least one optical fiber node using said wideband communications pathway; and E: using said Coax Domain Nodes, and data obtained from said wideband communications pathway, to transmit domain specific downstream data to said local CATV cable connected communications devices by modulating and transmitting at least selected portions of said data obtained from said wideband communications pathway using downstream CATV RF signals of approximately 1 GHz or less;

wherein said Coax Domain Nodes modulate said local upstream CATV RF signals by the steps of:
a) digitizing at least some of said upstream CATV RF signals of approximately 1 GHz frequency or less;
b) modulating at least some of the digitized upstream CATV RF signals to RF frequencies of approximately 1 GHz or greater, creating wideband communications pathway signals;

wherein at least some of said Coax Domain Nodes contain at least one Quadrature Amplitude Modulated (QAM) modulator device capable of encoding, on a domain specific basis, selected portions of said downstream wideband communications pathway data into RF QAM waveforms; and wherein modulating at least selected portions of said downstream wideband communications pathway data into downstream CATV RF signals of approximately 1 GHz frequency or less at said Coax Domain Nodes is done using said at least one QAM modulator device.

14. The method of claim 13, wherein said wideband communications pathway comprises CATV cable, CATV cable connectors and/or active devices capable of passing through frequencies of 1 GHz and higher, and amplifiers capable of overcoming the attenuation of RF frequencies of approximately 1 GHz or greater as a function of CATV cable distance; and wherein said wideband communications pathway, when said Coax Domain Nodes are bypassed, is further capable of passing through at least some RF frequencies between 5 to 865 MHz.

15. The method of claim 13, wherein said upstream CATV RF signals of approximately 1 GHz frequency or less comprise signals selected from the group consisting of Data Over Cable Service Interface Specification (DOCSIS), Digital Video Broadcasting (DVB), Aloha, and other non-DOCSIS signals, and wherein at least some of said DOCSIS signals are terminated by said Coax Domain Nodes and backhauled using said wideband communications pathway.

16. The method of claim 13, wherein said Coax Domain Nodes further comprise:

at least one QAM modulator device capable of encoding selected portions of digitally encoded downstream wideband communications pathway data into RF QAM waveforms of approximately 1 GHz frequency or less;

at least one software controllable switch that can be remotely directed to select, on a domain addressable basis, at least some of said digitally encoded downstream wideband communications pathway data and direct said at least one QAM modulator device to encode said selected digitally encoded downstream wideband communications pathway data into downstream RF QAM waveforms of approximately 1 GHz frequency or less at a selected set of frequencies within each said domain;

at least one remotely software controllable RF packet processor capable of detecting upstream data carried by CATV RF upstream signals waveforms of approximately 1 GHz frequency or less generated by communications device(s) within each domain, and digitally repackaging said upstream data and retransmitting said upstream data along said wideband communications pathway;

wherein said at least one software controllable switch and/ or said software controllable RF packet processor are capable of being remotely configured by software to assign or reassign, on a domain specific basis, the frequencies used by said upstream data and/or downstream data being carried by RF QAM waveforms of approximately 1 GHz frequency or less.

17. The method of claim 16, further remotely directing said software controllable switch to select, on a plurality of Coax Domain Nodes on said CATV Tree and Branch Network, a broadcast portion of said digitally encoded downstream wideband communications pathway data and direct the said at least one QAM modular device on each of said plurality of Coax Domain Nodes to encode said broadcast portion into broadcast RF QAM waveforms of approximately 1 GHz frequency or less for each of said plurality of Coax Domain Nodes.

18. The method of claim 16, further remotely directing said software controllable switch to select, on one or more selected Coax Domain Nodes on said CATV Tree and Branch Network, a narrowcast portion of said digitally encoded downstream wideband communications pathway data and direct the said at least one QAM modular device on each of said selected Coax Domain Nodes to encode said narrowcast portion into narrowcast downstream RF QAM waveforms of approximately 1 GHz frequency or less for each of said selected Coax Domain Nodes;

Wherein said Coax Domain Nodes intercept and terminate said narrowcast downstream RF QAM waveforms at said junctions in said CATV Tree and Branch network, thus preventing said narrowcast downstream RF QAM waveforms from being transmitted beyond said junctions.

\* \* \* \* \*